(12) United States Patent
Yasuda et al.

(10) Patent No.: US 9,252,436 B2
(45) Date of Patent: Feb. 2, 2016

(54) FUEL CELL SYSTEM

(75) Inventors: Shigeki Yasuda, Osaka (JP); Koichi Kusumura, Osaka (JP); Kiyoshi Taguchi, Osaka (JP); Yoshio Tamura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 324 days.

(21) Appl. No.: 13/260,844

(22) PCT Filed: Apr. 1, 2010

(86) PCT No.: PCT/JP2010/002414
§ 371 (c)(1),
(2), (4) Date: Sep. 28, 2011

(87) PCT Pub. No.: WO2010/113519
PCT Pub. Date: Oct. 7, 2010

(65) Prior Publication Data
US 2012/0021321 A1    Jan. 26, 2012

(30) Foreign Application Priority Data

Apr. 1, 2009  (JP) ................................. 2009-089440

(51) Int. Cl.
*H01M 8/04*  (2006.01)
*H01M 8/10*  (2006.01)

(52) U.S. Cl.
CPC ...... *H01M 8/04007* (2013.01); *H01M 8/04664* (2013.01); *H01M 8/04731* (2013.01);
(Continued)

(58) Field of Classification Search
None
See application file for complete search history.

(56) References Cited

U.S. PATENT DOCUMENTS

2003/0031905 A1 *  2/2003  Saito et al. ...................... 429/26
2003/0059656 A1 *  3/2003  Horiguchi et al. .............. 429/17
(Continued)

FOREIGN PATENT DOCUMENTS

CN    1494747 A    5/2004
CN    1639899 A    7/2005
(Continued)

OTHER PUBLICATIONS

Stephenson, "Preventing Exposed Water Pipes From Freezing," Apr. 1977, National Research Council of Canada.*
(Continued)

*Primary Examiner* — Ula C Ruddock
*Assistant Examiner* — Matthew Van Oudenaren
(74) *Attorney, Agent, or Firm* — McDermott Will & Emery LLP

(57) ABSTRACT

A fuel cell system (301) of the present invention comprises a fuel cell (1); a water circulating path (9) through which water associated with an operation of the fuel cell (1) circulates; a water circulator (10) for circulating water in the water circulating path (9); a heater (14) for heating the water circulating path (9); a first abnormality detector (29, 30) for detecting a first abnormality which is an abnormality relating to leakage of water from the water circulating path (9); and a controller (16); the fuel cell system being configured to cause the water circulator (10) to perform a water circulating operation for circulating the water in the water circulating path (9) and cause the heater (14) to perform a heating operation for heating the water circulating path (9), to suppress freezing in the water circulating path, wherein the controller (16) is configured to inhibit the water circulating operation for suppressing freezing and not to inhibit the heating operation for suppressing freezing, in a case where the fuel cell system (301) is shut down in response to detection of the first abnormality by the first abnormality detector (29, 30).

12 Claims, 15 Drawing Sheets

(52) U.S. Cl.
CPC ...... *H01M 8/04768* (2013.01); *H01M 8/04776* (2013.01); *H01M 8/04037* (2013.01); *H01M 8/04223* (2013.01); *H01M 8/04253* (2013.01); *H01M 8/04268* (2013.01); *H01M 8/04492* (2013.01); *H01M 8/04522* (2013.01); *H01M 8/04716* (2013.01); *H01M 8/04843* (2013.01); *H01M 2008/1095* (2013.01); *Y02E 60/50* (2013.01)

(56) References Cited

U.S. PATENT DOCUMENTS

| | | | |
|---|---|---|---|
| 2003/0162063 A1 | 8/2003 | Yoshizawa et al. | |
| 2004/0081870 A1 | 4/2004 | Miyazawa et al. | |
| 2005/0095473 A1* | 5/2005 | Sakakida et al. | 429/20 |
| 2005/0255351 A1* | 11/2005 | Fukuda | 429/22 |
| 2006/0035120 A1* | 2/2006 | Sakai | 429/22 |
| 2008/0063902 A1* | 3/2008 | Kawasaki et al. | 429/10 |
| 2008/0311453 A1 | 12/2008 | Kobayashi | |
| 2009/0181271 A1 | 7/2009 | Yasuda et al. | |

FOREIGN PATENT DOCUMENTS

| | | |
|---|---|---|
| JP | 04-328264 | 11/1992 |
| JP | 11-187918 | 7/1999 |
| JP | 2005-294197 | 10/2005 |
| JP | 2006-185706 | 7/2006 |
| JP | 2006-250394 | 9/2006 |
| JP | 2007-280638 A | 10/2007 |
| JP | 2007-294186 | 11/2007 |
| JP | 2009-026482 | 2/2009 |
| JP | 2009-026719 | 2/2009 |
| JP | 2009026718 A | 2/2009 |
| WO | 2007-142278 A1 | 12/2007 |

OTHER PUBLICATIONS

Chinese Office Action issued in corresponding Chinese Application No. 2010-800151410, dated Aug. 5, 2013, with English translation.
European Search Report issued in European Application No. 10758298.3, dated May 16, 2014.

* cited by examiner

FUEL CELL SYSTEM

This application is the U.S. National Phase under 35 U.S.C. §371 of International Application No. PCT/JP2010/002404, filed on Apr. 1, 2010, which in turn claims the benefit of Japanese Application No. 2009-089440, filed on Apr. 1, 2009, the disclosures of which Applications are incorporated by reference herein.

TECHNICAL FIELD

The present invention relates to a fuel cell system including a fuel cell and a water circulating path. In particular, the present invention relates to a freezing suppressing means at abnormal shut down of the fuel cell system.

BACKGROUND ART

In general, a fuel cell system includes a fuel cell which generates electric power by chemically reacting fuel gas and oxidizing gas, and a cooling water path for cooling the fuel cell which generates heat resulting from the power generation, and is configured to control the temperature of the fuel cell by regulating the rate (degree) of cooling according to a power generation amount.

If the fuel cell system having the above configuration is left outdoors without being operated for a certain time or longer, water within the cooling water path freezes as an outside air temperature decreases. As a result of this, power generation might be unfeasible because of a failure to perform temperature control of the fuel cell at next start-up, etc.

In view of the circumstance, for example, there is known a fuel cell system which includes an outside air temperature detecting means for directly or indirectly detecting an outside air temperature and a water temperature detecting means for detecting the water temperature of cooling water, and executes a freezing suppressing operation based on the outside air temperature detected by the outside air temperature detecting means and the water temperature detected by the water temperature detecting means (e.g., Patent Literature 1).

FIG. 15 is a block diagram showing a configuration of a conventional fuel cell system disclosed in Patent Literature 1.

As shown in FIG. 15, the conventional fuel cell system includes a fuel cell 36 for generating electric power using fuel gas and oxidizing gas, a cooling water path 37 through which cooling water for cooling the fuel cell 36 flows, a hot water path 38 through which hot water which recovers heat from the cooling water flowing through the cooling water path 37 flows, a hot water storage tank 39 for storing hot water generated by recovering heat from the cooling water, a heat exchanger 40 for exchanging heat between the cooling water in the cooling water path 37 and the hot water in the hot water path 38, a cooling water circulator 41 for circulating water in the cooling water path 37, a heater 42 for heating the cooling water path 37, a hot water circulator 43 for circulating the water in the hot water path 38, an outside air temperature detecting means 44 for detecting an outside air temperature, a cooling water temperature detecting means 45 for detecting the temperature of the cooling water, a hot water temperature detecting means 46 for detecting the temperature of the hot water, and a controller 47.

When the controller 47 determines that the water in the cooling water path 37 and the water in the hot water path 38 will possibly freeze based on the outside air temperature detected by the outside air temperature detecting means 44, the cooling water temperature detected by the cooling water temperature detecting means 45 and the hot water temperature detected by the hot water temperature detecting means 46, it causes the cooling water circulator 41 to circulate the cooling water, the hot water circulator 43 to circulate the hot water, and the heater 42 to perform heating, as the freezing suppressing operation. This can suppress the cooling water and the hot water from freezing.

When the fuel cell system is abnormally shut down for some cause or another, the controller 47 determines whether or not each of the cooling water path 37 and the hot water path 38 should execute the freezing suppressing operation based on the cause.

For example, in a case where the fuel cell system is abnormally shut down due to leakage of water from the cooling water path 37, the cooling water circulator 41 operates without the cooling water if the cooling water circulator 41 circulates the cooling water as the freezing suppressing operation, and therefore the controller 47 does not execute circulating of the cooling water. In this case, if the heater 42 performs heating as the freezing suppressing operation, it performs heating in a state in which there is no cooling water to be heated in the cooling water path 37, and therefore a region in the vicinity of the heater 42 is more likely to be heated in excess. For this reason, the controller 47 causes the heater 42 not to perform heating. For example, in a case where the fuel cell system is abnormally shut down due to leakage of water from the hot water path 38, the hot water circulator 43 operates without the hot water if the hot water circulator 43 circulates the hot water, and therefore the controller 47 does not execute circulating of the hot water. In this way, damage to the cooling water circulator 41, the hot water circulator 43 and the heater 42 which are components for executing the freezing suppressing operation is suppressed.

The leakage of water from the cooling water path 37 is detected as follows, for example.

If water leaks from the cooling water path 37 during power generation of the fuel cell 36, the temperature of the fuel cell 36 increases excessively. Therefore, by detecting the excessive increase in the temperature of the fuel cell 36, the leakage of water from the cooling water path 37 can be detected. In a case where the fuel cell system includes as the cooling water temperature detecting means 45, a first cooling water temperature detecting means 48 for detecting the water temperature of cooling water at an inlet side of the fuel cell 36 and a second cooling water temperature detecting means 49 for detecting the water temperature of cooling water at an outlet side of the fuel cell 36, a heat exchange ability of the heat exchanger 40 decreases if water leaks from the hot water path 38 during the power generation of the fuel cell 36, so that the cooling water temperature detected by the first cooling water temperature detecting means 48 gets close to the cooling water temperature detected by the second cooling water temperature detecting means 49. Therefore, by detecting the fact that the cooling water temperature detected by the first cooling water temperature detecting means 48 is close to the cooling water temperature detected by the second cooling water temperature detecting means 49, leakage of water from the hot water path 38 can be detected.

CITATION LISTS

Patent Literature

Patent Literature 1: Japanese Laid-Open Patent Application Publication No. 2007-294186

SUMMARY OF THE INVENTION

Technical Problem

Even when water leaks from the cooling water path in the fuel cell system, some water is sometimes left in the cooling water path. However, in the fuel cell system disclosed in Patent Literature 1, in a case where an abnormality of leakage of water from the cooling water path occurs, not only the cooling water circulator does not circulate water but also the heater does not perform heating. Therefore, in a case where some water is left in the cooling water path, there is no means to suppress this remaining water from freezing, and therefore, the fuel cell is more likely to freeze. As a result, for example, power generation might be unfeasible at next start-up.

The present invention has been made in view of the above mentioned problem, and an object of the present invention is to provide a fuel cell system capable of suppressing a water leakage damage from spreading, of reducing a chance of a failure in a water circulator which would be caused by operating the water circulator without water, and of suppressing freezing of water remaining in a water path from which water is leaking, in the fuel cell system in which the water leakage abnormality has occurred and thereby the fuel cell system is shut down.

Solution to Problem

To solve the above described problem, a method of operating of a fuel cell system comprises steps of (a) circulating water in a water circulating path in the fuel cell system by a water circulator to suppress freezing in the water circulating path; (b) heating a recovered water tank for storing water which has been recovered from an exhaust gas discharged from a fuel cell and has not been purified in a purifier, to suppress freezing in the recovered water tank; (c) detecting a first abnormality which is an abnormality relating to leakage of water from the water circulating path; and (d) inhibiting the step (a) and not inhibiting the step (b), in a case where the fuel cell system is shut down in response to detection of the first abnormality. The water circulating path includes a recovered water circulating path comprising the recovered water tank and a recovered water path through which the water circulates between the recovered water tank and [a cooling water tank. The step (a) comprises steps of: (a1) circulating water in a first water circulating path by a first water circulator to suppress freezing in the first water circulating path; and (a2) circulating water in a second water circulating path by a second water circulator to suppress freezing in the second water circulating path. The step (c) comprises steps of (c1) detecting, as the first abnormality, an abnormality relating to leakage of water from the first water circulating path; and (c2) detecting, as the first abnormality, an abnormality relating to leakage of water from the second water circulating path. The step (d) comprises steps of: (d1) inhibiting the step (a1) and not inhibiting the step (b), in a case where leakage of water from the first water circulating path is detected but leakage of water from the second water circulating path is not detected, and the fuel cell system is shut down; and (d2) not inhibiting the step (a2) and not inhibiting the step (b), in a case where leakage of water from the first water circulating path is detected but leakage of water from the second water circulating path is not detected, and the fuel cell system is shut down. One of the first water circulating path and the second water circulating path includes the recovered water circulating path. The second water circulating path includes the recovered water circulating path. The first water circulating path includes one of: a cooling water circulating path comprising a cooling water path through which cooling water for cooling the fuel cell flows, and the cooling water tank for storing the cooling water; and a hot water circulating path comprising a hot water path through which hot water for recovering heat from the cooling water flowing through the cooling water path, and a hot water storage tank for storing the hot water.

According to another aspect of the present disclosure, a method of operating a fuel cell system, comprises steps of (a) circulating water in a water circulating path in the fuel cell system by a water circulator to suppress freezing in the water circulating path; (b) heating a recovered water tank for storing water which has been recovered from an exhaust gas discharged from a fuel cell and has not been purified in a purifier, to suppress freezing in the recovered water tank; (c) detecting a first abnormality which is an abnormality relating to leakage of water from the water circulating path; (d) inhibiting the step (a) and not inhibiting the step (b), in a case where the fuel cell system is shut down in response to detection of the first abnormality, detecting a second abnormality different from the first abnormality; and not inhibiting the steps (a) and (b), in a case where the fuel cell system is shut down in response to detection of the second abnormality. The water circulating path includes a recovered water circulating path comprising the recovered water tank and a recovered water path through which the water circulates between the recovered water tank and a cooling water tank. The step (a) comprises steps of: (a1) circulating water in a first water circulating path by a first water circulator to suppress freezing in the first water circulating path; and (a2) circulating water in a second water circulating path by a second water circulator to suppress freezing in the second water circulating path. The step (c) comprises steps of (c1) detecting, as the first abnormality, an abnormality relating to leakage of water from the first water circulating path; and (c2) detecting, as the first abnormality, an abnormality relating to leakage of water from the second water circulating path. The step (d) comprises steps of: (d1) inhibiting the step (a1) and not inhibiting the step (b), in a case where leakage of water from the first water circulating path is detected but leakage of water from the second water circulating path is not detected, and the fuel cell system is shut down; and (d2) not inhibiting the step (a2) and not inhibiting the step (b), in a case where leakage of water from the first water circulating path is detected but leakage of water from the second water circulating path is not detected, and the fuel cell system is shut down. One of the first water circulating path and the second water circulating path includes the recovered water circulating path. The second water circulating path includes the recovered water circulating path. The first water circulating path includes one of: a cooling water circulating path comprising a cooling water path through which cooling water for cooling the fuel cell flows, and the cooling water tank for storing the cooling water; and a hot water circulating path comprising a hot water path through which hot water for recovering heat from the cooling water flowing through the cooling water path, and a hot water storage tank for storing the hot water.

According to yet another aspect of the present disclosure, a method of operating a fuel cell system, comprises steps of: (a) circulating water in a water circulating path in the fuel cell system by a water circulator to suppress freezing in the water circulating path; (b) heating a recovered water tank for storing water which has been recovered from an exhaust gas discharged from a fuel cell and has not been purified in a purifier, to suppress freezing in the recovered water tank; (c) detecting a first abnormality which is an abnormality relating to leakage of water from the water circulating path; and (d) inhibiting the step (a) and not inhibiting the step (b), in a case where the fuel cell system is shut down in response to detection of the first abnormality. The water circulating path includes a recovered water circulating path comprising the recovered water tank and a recovered water path through which the water circulates between the recovered water tank and a cooling water tank. The water circulating path further includes at least one of: a cooling water circulating path comprising a cooling water path through which cooling water for cooling the fuel cell flows, and the cooling water tank for storing the cooling water; and a hot water circulating path comprising a hot water path through which hot water for recovering heat from the cooling water flowing through the cooling water path, and a hot water storage tank for storing the hot water. The step (a) comprises steps of: (a1) circulating water in a first water circulating path by a first water circulator to suppress freezing in the first water circulating path; and (a2) circulating water in a second water circulating path by a second water circulator to suppress freezing in the second water circulating path. The step (c) comprises steps of: (c1) detecting, as the first abnormality, an abnormality relating to leakage of water from the first water circulating path; and (c2) detecting, as the first abnormality, an abnormality relating to leakage of water from the second water circulating path. The step (d) comprises steps of: (d1) inhibiting the step (a1) and not inhibiting the step (b), in a case where leakage of water from the first water circulating path is detected but leakage of water from the second water circulating path is not detected, and the fuel cell system is shut down; and (d2) not inhibiting the step (a2) and not inhibiting the step (b), in a case where leakage of water from the first water circulating path is detected but leakage of water from the second water circulating path is not detected, and the fuel cell system is shut down. One of the first water circulating path and the second water circulating path includes the recovered water circulating path. The second water circulating path includes the recovered water circulating path. The first water circulating path includes one of the cooling water circulating path and the hot water circulating path.

The above and further objects, features and advantages of the present invention will more fully be apparent from the following detailed description of preferred embodiments with accompanying drawings.

Advantageous Effects of the Invention

The present invention is configured as described above, and achieves an advantage that it is possible to suppress a water leakage damage from spreading, reduce a chance of a failure in a water circulator which would be caused by operating the water circulator without water, and suppress freezing of water remaining in a water path from which the water is leaking, in the fuel cell system in which a water leakage abnormality has occurred and thereby the fuel cell system is shut down.

DESCRIPTION OF EMBODIMENTS

Figure 1:
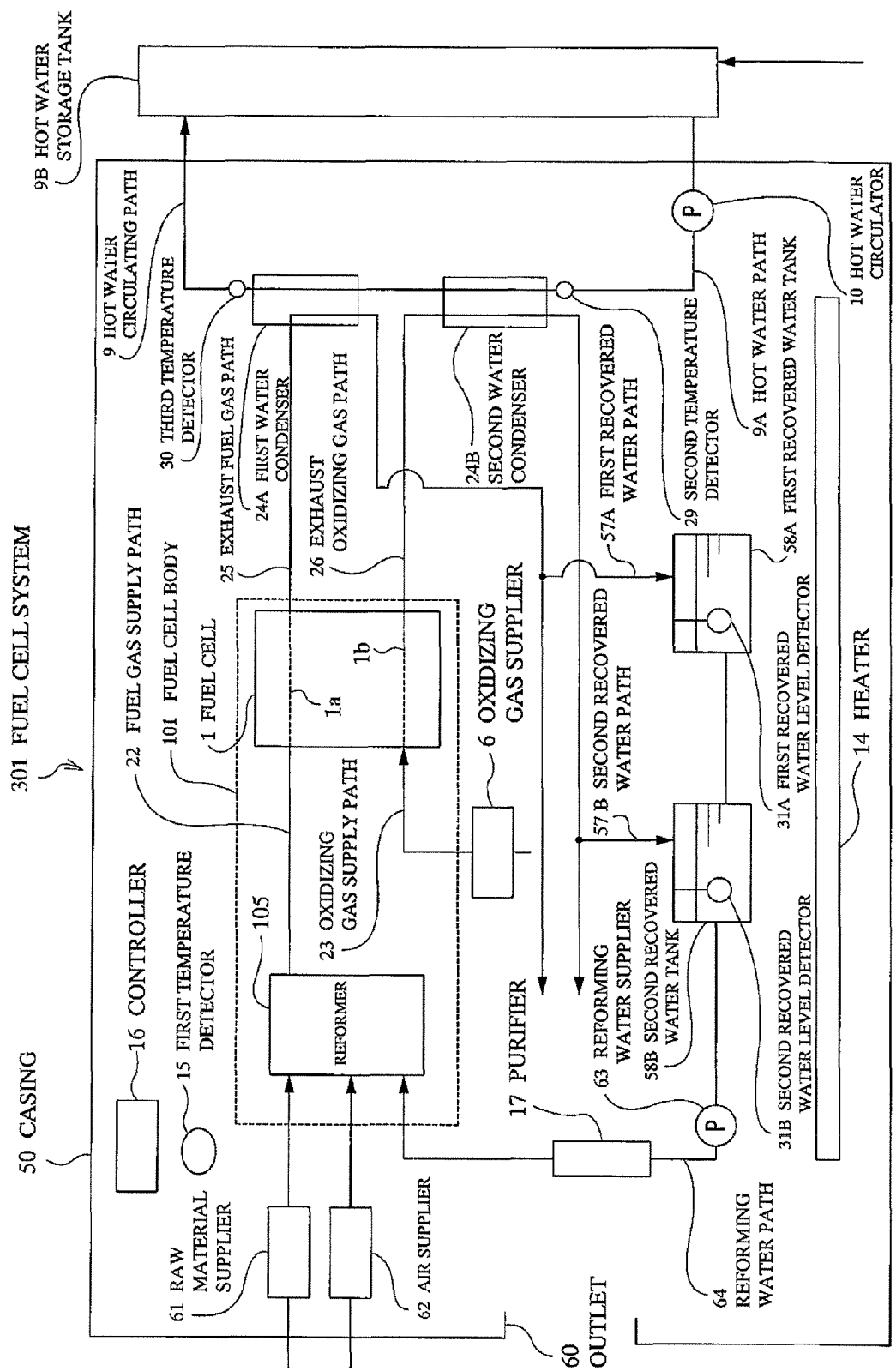
FIG. 1 is a block diagram showing a configuration of a fuel cell system according to Embodiment 1 of the present invention.

Hereinafter, embodiments of the present invention will be described with reference to the drawings. Throughout the drawings, the same or corresponding components are designated by the same reference numerals and will not be described in repetition.

A fuel cell system of the present invention comprises a fuel cell configured to generate electric power using fuel gas and oxidizing gas; a water circulating path through which water associated with an operation of the fuel cell circulates; a water circulator for circulating the water in the water circulating path; a heater for heating the water circulating path; a first abnormality detector for detecting a first abnormality which is an abnormality relating to leakage of water from the water circulating path; and a controller; the fuel cell system being configured to cause the water circulator to perform a water circulating operation for circulating the water in the water circulating path and cause the heater to perform a heating operation for heating the water circulating path, to suppress freezing in the water circulating path.

The controller is configured to inhibit the water circulating operation for suppressing freezing and not to inhibit the heating operation for suppressing freezing, in a case where the fuel cell system is shut down in response to detection of the first abnormality by the first abnormality detector.

The "fuel cell" may be any fuel cell so long as it generates electric power using fuel gas and oxidizing gas. As the "fuel cell," for example, a polymer electrolyte fuel cell, a solid oxide fuel cell, a phosphorous acid fuel cell, a molten carbonate fuel cell, etc., may be used. As the "fuel gas," for example, pure hydrogen, hydrogen-containing gas (reformed gas), etc., may be used. As the "oxidizing gas," for example, pure oxygen, air, etc., may be used.

The "water circulating path" refers to all paths through which water associated with the operation of the fuel cell flows. For example, the "water circulating path" includes a cooling water circulating path, a recovered water circulating path, a hot water circulating path, etc., as described later.

As the "water circulator," for example, a pump (rotary), a plunger pump, etc., may be used.

The "first abnormality" is defined as an abnormality relating to leakage of water from the above stated "water circulating path." The "first abnormality detector" refers to a detector for directly or indirectly detecting leakage of water from the above stated "water circulating path." Directly detecting leakage of water means that "leakage of water" itself is detected. Indirectly detecting leakage of water means that a parameter (physical amount) which varies correlatively with "leakage of water" is detected. When "leakage of water" is indirectly detected, "leakage of water" can be detected by using a correlation between the detected parameter and "leakage of water." For example, in a case where the "first abnormality detector" is constituted by a detector for detecting the parameter correlating with "leakage of water," a determiner determines whether or not water is leaking from the "water circulating path" based on the level of the parameter detected by the detector and a determination reference (e.g., threshold) set based on the correlation between the parameter and "leakage of water."

The "first abnormality detector" may be disposed inside a casing for accommodating major components (e.g., power generation unit including fuel cell, etc.,) in the fuel cell system, or outside the casing. In a case where the detector is disposed outside the casing, the "first abnormality detector" may be connected to a control unit by a wire or by radio.

The "heater" may be configured in any way so long as it can heat the above stated "water circulating path." Therefore, a function and installation configuration of the "heater" are not particularly limited except that so long as it can heat the "water circulating path."

For example, the "heater" may be constituted by a single heater or by a plurality of heaters arranged in a distributed manner. As the "heater," for example, a ceramic heater may be used.

The phrase "cause the water circulator to perform a water circulating operation for circulating the water in the water circulating path and cause the heater to perform a heating operation for heating the water circulating path to suppress freezing in the water circulating path" means the freezing suppressing operation according to such a configuration.

The "controller" may be configured in any way so long as "it is configured to inhibit the water circulating operation for suppressing freezing and not to inhibit the heating operation for suppressing freezing, in a case where the fuel cell system is shut down in response to detection of the first abnormality by the first abnormality detector." As defined in specification and claims, the controller is meant to include a controller group as well as a single controller. Therefore, the "controller" may be constituted by a single controller for performing centralized control or by a plurality of controllers for executing distributed control cooperatively with each other. As the "controller," for example, a microcomputer, a programmable controller, a logic circuit, etc., may be used.

The term "inhibit the water circulating operation" is, in other words, "does not permit the water circulating operation." So, the term "does not inhibit the water circulating operation" is, in other words, "permit the water circulating operation." For example, when a particular condition is met, the water circulating operation is executed.

In accordance with the foregoing description, since the water circulating operation as the freezing suppressing operation is inhibited in the case where the abnormality relating to leakage of water from the water circulating path is detected, it is possible to suppress a water leakage damage from spreading, and reduce a chance of a failure in a water circulator which would be caused by operating the water circulator without water. On the other hand, since the heating operation as the freezing suppressing operation is not inhibited, the heating operation as the freezing suppressing operation is executed if a particular condition is met, and thereby it is possible to suppress freezing of water remaining in a water path in which it is not possible to suppress freezing of water by circulating it. As a result, in the fuel cell system in a shut-down state due to occurrence of the abnormality of leakage of water, it is possible to suppress a water leakage damage from spreading, and reduce a chance of a failure in a water circulator which would be caused by operating the water circulator without water. In addition, it is possible to suppress freezing of water remaining in the water path from which water is leaking.

The fuel cell system may further comprise a second abnormality detector for detecting a second abnormality different from the first abnormality; wherein the controller may be configured to inhibit the water circulating operation for suppressing freezing and not to inhibit the heating operation for suppressing freezing, in a case where the fuel cell system is shut down in response to detection of the first abnormality by the first abnormality detector; and wherein the controller may be configured not to inhibit the water circulating operation for suppressing freezing and not to inhibit the heating operation for suppressing freezing, in a case where the fuel cell system is shut down in response to detection of the second abnormality by the second abnormality detector.

The "second abnormality" is defined as an abnormality in the fuel cell system, which is different from the "first abnormality." Note that the "second abnormalities" do not include all of the abnormalities other than the "first abnormalities," but include at least a part of the abnormalities other than the "first abnormalities." As abnormalities in the fuel cell system, for example, there are abnormalities in components in the fuel cell system, abnormalities in control for the components, etc. Table 1 lists specific examples of the first abnormalities and the second abnormalities.

TABLE 1

| First abnormalities | Second abnormalities |
| --- | --- |
| Leakage of water from a water circulating path | Abnormal value measured by an oxidizing gas flow meter |
| Abnormal reduction in a water level in a circulating water tank | Inoperability of valves in an oxidizing gas path and a fuel gas path |
| Abnormal increase in a temperature of a fuel cell cooled by hot water | Leakage abnormality from a valve in an oxidizing gas path |
| Abnormal hot water temperature difference before and after exchange heat with cooling water | Leakage abnormality from a valve in a fuel gas path |
| Abnormal cooling water temperature difference before and after exchange heat with hot water | Abnormal temperature detected by a temperature detector in a reformer |
| | Disconnection/short circuit in a temperature detector in a reformer |
| | Extinction abnormality in a combustor for heating a reformer |
| | Ignition abnormality in a combustor for heating a reformer |

As illustrated in table 1, as examples of the first abnormalities, there are leakage of water from a water circulating path, an abnormal reduction in a water level in a water tank (circulating water tank) in the water circulating path, an abnormal increase in a temperature of a fuel cell cooled by hot water, an abnormal hot water temperature difference before and after exchange heat in a case where a heat exchanger for exchanging heat between cooling water in the fuel cell and hot water is provided, an abnormal cooling water temperature difference before and after exchange heat in a case where a heat exchanger for exchanging heat between cooling water and hot water is provided, etc., for example. As examples of the second abnormalities, there are an abnormal value measured by an oxidizing gas flow meter, inoperability of valves in an oxidizing gas path and a fuel gas path, a leakage abnormality from a valve in an oxidizing gas path, a leakage abnormality from a valve in the fuel gas path, an abnormal temperature detected by a temperature detector in a reformer, disconnection/short circuit in the temperature detector in the reformer, an extinction abnormality in a combustor for heating the reformer, an ignition abnormality in the combustor for heating the reformer, etc., for example.

The "second abnormality detector" refers to a detector for directly or indirectly detecting the second abnormality like the "first abnormality detector."

In accordance with this configuration, in the case where the abnormality relating to leakage of water from the water circulating path is detected, it is possible to suppress a water leakage damage from spreading, and reduce a chance of a failure in a water circulator which would be caused by operating the water circulator without water. In addition, it is possible to suppress freezing of water remaining in a water path from which the water is leaking. On the other hand, in the case where the abnormality which does not relate to leakage of water is detected, it is possible to suppress freezing in the water circulating path like normal cases.

The water circulating path may be at least one of: a cooling water circulating path comprising a cooling water path through which cooling water for cooling the fuel cell flows; and a cooling water tank for storing the cooling water; a hot water circulating path comprising a hot water path through which hot water for recovering heat from the cooling water flowing through the cooling water path and a hot water storage tank for storing the hot water; and a recovered water circulating path comprising a recovered water tank for storing water recovered from an exhaust gas from the fuel cell and a recovered water path through which the water circulates between the recovered water tank and the cooling water tank.

The water circulating path may comprise a first water circulating path and a second water circulating path; the water circulator comprises a first water circulator for circulating water in the first water circulating path and a second water circulator for circulating water in the second water circulating path; the heater comprises a first heater for heating the first water circulating path and a second heater for heating the second water circulating path; the controller may be configured to inhibit the first water circulator from performing a water circulating operation for suppressing freezing in the first water circulating path, not to inhibit the first heater from performing a heating operation for suppressing freezing in the first water circulating path, not to inhibit the second water circulator from performing a water circulating operation for suppressing freezing in the second water circulating path, and not to inhibit the second heater from performing a heating operation for suppressing freezing in the second water circulating path, in a case where leakage of water from the first water circulating path is detected by the first abnormality detector as the first abnormality but leakage of water from the second water circulating path is not detected, and the fuel cell system is shut down.

In accordance with this configuration, in the fuel cell system including a plurality of water circulating paths, it is possible to suppress a water leakage damage from spreading, and reduce a chance of a failure in a water circulator which would be caused by operating the water circulator without water, for the water circulating path in which the abnormality relating to leakage of water is detected. In addition, it is possible to suppress freezing of water remaining in a water path from which the water is leaking. On the other hand, for the water circulating path in which the abnormality relating to leakage of water is not detected, it is possible to suppress freezing in the water circulating path like normal cases.

The first water circulating path and the second water circulating path may be a combination of two from among a cooling water circulating path comprising a cooling water path through which cooling water for cooling the fuel cell flows; and a cooling water tank for storing the cooling water; a hot water circulating path comprising a hot water path through which hot water for recovering heat from the cooling water flowing through the cooling water path and a hot water storage tank for storing the hot water; and a recovered water circulating path comprising a recovered water tank for storing water recovered from an exhaust gas from the fuel cell and a recovered water path through which the water circulates between the recovered water tank and the cooling water tank.

The controller may be configured to set a amount of heating in the heating operation performed by the heater to suppress freezing, in the case where the fuel cell system is shut down in response to detection of the first abnormality by the first abnormality detector, larger than an amount of heating performed by the heater in the case where the first abnormality is not detected.

In the case where the abnormality relating to leakage of water is detected, an anti-freezing ability decreases because of non-execution of the water circulating operation, as compared to the case where the abnormality relating to leakage of water is not detected. However, in accordance with this configuration, the amount of heating performed by the heater in the case where the abnormality relating to leakage of water is detected, is set larger than that in the case where the abnormality relating to leakage of water is not detected. Therefore, it is possible to prevent a reduction in the anti-freezing ability which would be caused by non-execution of the water circulating operation.

The controller may be configured to, in the heating operation performed by the first heater and the heating operation performed by the second heater to suppress freezing in the case where leakage of water from the first water circulating path is detected by the first abnormality detector but leakage of water from the second water circulating path is not detected, and the fuel cell system is shut down, set an amount of heating performed by the first heater larger than in the case where the first abnormality is not detected by the first abnormality detector; and set an amount of heating performed by the second heater equal to an amount of heating performed by the second heater in the case where the first abnormality is not detected.

In accordance with this configuration, in order to prevent the anti-freezing ability from decreasing because of non-execution of the water circulating operation, for only the first water circulating path in which the abnormality relating to leakage of water is detected, the amount of heating performed by the first heater is set larger than that in the case where the first abnormality is not detected. On the other hand, for the second water circulating path in which the abnormality relating to leakage of water is not detected, the amount of heating performed by the second heater is set equal to that in the case where the first abnormality is not detected. As a result, it is possible to suppress an increase in electric power consumption due to an increase in the amount of heating caused by unnecessary heating.

The fuel cell system may further comprise a temperature detector for detecting a temperature of the water; wherein the controller may be configured to execute the heating operation to suppress freezing if the temperature detector detects a temperature which is not higher than a first threshold in the case where the first abnormality detector does not detect the first abnormality; and the controller may be configured to execute the heating operation to suppress freezing if the temperature detector detects a temperature which is not higher than a second threshold higher than the first threshold in the case where first abnormality detector detects the first abnormality.

The "water temperature for detecting the temperature of water" refers to a temperature detector for directly or indirectly detecting the temperature of water. Therefore, the temperature detector may be a temperature detector for directly detecting the temperature of "water" relating to the operation of the "fuel cell," or a temperature detector for detecting the temperature (i.e., temperature from which the temperature of "water" is indirectly detected) correlating with the temperature of "water." To be specific, there are a temperature detector for detecting an outside temperature, and a temperature detector provided in a predetermined location other than a water path inside the casing of the fuel cell system. In the case where the temperature correlating with the temperature of "water" is detected, an optimal threshold is set to suppress water from freezing with respect to the temperature correlating with the temperature of "water," by utilizing the correlation between the temperature correlating with the temperature of "water" and the temperature of "water." One or a plurality of "temperature detectors" may be provided. As the "temperature detector," a temperature sensor such as a platinum resistance thermometer, a thermo couple, or a thermistor may be used.

The "first threshold" is defined as a temperature which is not lower than a freezing point (0 degrees C.) of water. The "first threshold" depends on a design of the fuel cell system and therefore can be determined by, for example, an experiment, a simulation, a calculation, etc. In a case where the "first threshold" is determined along with the "second threshold," the first threshold is defined as a temperature with which it is determined that heating performed by the heater is required to suppress freezing in a state where water is circulated. And, the second threshold is defined as a temperature with which it is determined that heating performed by the heater is required to suppress freezing in a state where water is not circulated, and is higher than the first threshold. The "second threshold" depends on a design of the fuel cell system and therefore can be determined by, for example, an experiment, a simulation, a calculation, etc.

In accordance with this configuration, the temperature threshold of the temperature detector at which the heater is actuated in the case where the abnormality relating to leakage of water is detected is set higher than that in the case where the abnormality relating to leakage of water is not detected. This makes it possible to advance the start of actuation of the heater to address a decrease in the temperature of water can be advanced. Therefore, it is possible to prevent a reduction in the anti-freezing ability which would be caused by non-execution of the water circulating operation.

The fuel cell system may further comprise a temperature detector for detecting a temperature of the water; wherein the controller may be configured to operate the first heater and the second heater as the heating operation to suppress freezing if the temperature detector detects a temperature which is not higher than a first threshold; the controller may be configured to operate the first heater to suppress freezing if the temperature detector detects a temperature which is not higher than a second threshold higher than the first threshold in the case where leakage of water from the first water circulating path is detected by the first abnormality detector as the first abnormality but leakage of water from the second water circulating path is not detected, and the fuel cell system is shut down; and the controller may be configured to operate the second heater to suppress freezing if the temperature detector detects a temperature which is not higher than the first threshold, in the case where leakage of water from the first water circulating path is detected by the first abnormality detector as the first abnormality but leakage of water from the second water circulating path is not detected, and the fuel cell system is shut down.

In accordance with this configuration, for only the first water circulating path in which the abnormality relating to leakage of water is detected, the temperature threshold of the temperature detector at which the heater is actuated is set higher than that in the case where the first abnormality is not detected, in order to advance the start of actuation of the heater to address a decrease in the temperature of water. For the second water circulating path in which the abnormality relating to leakage of water is not detected, the temperature threshold of the temperature detector at which the heater is actuated is set equal to that in the case where the first abnormality is not detected. As a result, it is possible to suppress an increase in electric power consumption due to the fact that the start of actuation of the heater is advanced unnecessarily.

Hereinafter, embodiments of the present invention will be described will be specifically discussed.

Embodiment 1

In Embodiment 1 of the present invention, "water circulating path" is a hot water circulating path and "fuel cell" is a solid oxide fuel cell (SOFC).

[Configuration]

FIG. 1 is a block diagram showing a configuration of a fuel cell system according to Embodiment 1 of the present invention.

First of all, a configuration of hardware will be described.

As shown in FIG. 1, a fuel cell system 301 of Embodiment 1 includes a casing 50 having an inlet (not shown) and an outlet 60, and a hot water storage tank 9B. The casing 50 accommodates components (excluding casing 50) constituting the fuel cell system 301 other than the hot water storage tank 9B.

A fuel cell 1 which is an example of the above stated "fuel cell" is disposed in the casing 50. In Embodiment 1, the fuel cell 1 is constituted by, for example, the solid oxide fuel cell (SOFC). Inside the fuel cell 1, an internal fuel gas passage 1a is formed to contact an anode, and the outlet of a reformer 105 is connected to the inlet of the internal fuel gas passage 1a via a fuel gas supply path 22. The reformer 105 and the fuel cell 1 constitute a fuel cell body 101.

A raw material is supplied from a raw material supplier 61 to the material gas inlet of the reformer 105 via a material gas supply passage 19. Any material gas may be used so long as hydrogen-containing gas is generated from the material gas by reforming the material gas. As the material gas, for example, a hydrocarbon based gas such as a natural gas may be used. The raw material supplier 61 may be constituted by, for example, a booster pump connected to a material gas source (e.g., infrastructure of the natural gas), a flow control valve, etc. Air is supplied from an air supplier 62 to the air inlet of the reformer 105. As the air supplier 62, for example, a blower or the like may be used. Reforming water is supplied to the reforming water inlet of the reformer 105 through a reforming water path 64. The reformer 105 generates hydrogen-containing gas (reformed gas) by an auto thermal method using the material gas and reforming water supplied. The hydrogen-containing gas is supplied to the fuel cell 1 as the fuel gas. The hydrogen-containing gas (reformed gas) is an example of the above stated "fuel gas". The reformer 105 is an example of a fuel gas supplier.

An oxidizing gas supplier 6 is connected to the inlet of an internal oxidizing gas passage 1*b* of the fuel cell 1 via an oxidizing gas supply path 23.

The oxidizing gas supplier 6 supplies the above "oxidizing gas" to the oxidizing gas supply path 23. The oxidizing gas supplier 6 is constituted by, for example, a blower or the like, and supplies air as the "oxidizing gas."

In the fuel cell 1, the fuel gas and the oxidizing gas supplied to the anode and the cathode, respectively, chemically react with each other, and thereby electricity and heat are generated.

The upstream end of an exhaust fuel gas path 25 is connected to the outlet of the internal fuel gas passage 1*a* of the fuel cell 1. The fuel gas (hereinafter referred to as exhaust fuel gas) which has not chemically reacted (has not been consumed) in the anode is exhausted to an exhaust fuel gas path 25. The downstream end of the exhaust fuel gas path 25 is connected to, for example, a combustor (not shown). A first water condenser 24A is provided on the exhaust fuel gas path 25. The first water condenser 24A is constituted by a heat exchanger and is configured to exchange heat between the exhaust fuel gas flowing through a primary passage thereof and hot water flowing through a secondary passage thereof, thereby generating condensed water from the exhaust fuel gas, and separating it from the exhaust fuel gas.

A portion of the exhaust fuel gas path 25 which is downstream of the first water condenser 24A is tilted in a downward direction. From the downstream portion, a first recovered water path 57A branches in a downward direction. The lower end of the first recovered water path 57A is connected to a first recovered water tank 58A. In this configuration, the condensed water having been separated from the exhaust fuel gas in the first water condenser 24A flows in a downward direction through the exhaust fuel gas path 25 and then reaches the first recovered water tank 58A via the first recovered water path 57A and is stored therein. Meanwhile, the exhaust fuel gas from which the condensed water has been removed in the first water condenser 24A flows to the combustor through the exhaust fuel gas path 25 and is combusted therein. Then, it is released to atmosphere.

The upstream end of an exhaust oxidizing gas path 26 is connected to the outlet of the internal oxidizing gas passage 1*b* of the fuel cell 1. Oxidizing gas (hereinafter referred to as exhaust oxidizing gas) which has not chemically reacted (has not been consumed) in the cathode is exhausted to the exhaust oxidizing gas path 26. The downstream end of the exhaust oxidizing gas path 26 is released to, for example, atmosphere. A second water condenser 24B is provided on the exhaust oxidizing gas path 26. The second water condenser 24B is constituted by a heat exchanger and is configured to exchange heat between the exhaust oxidizing gas flowing through a primary passage thereof and hot water flowing through a secondary passage, thereby generating condensed water from the exhaust oxidizing gas, and separating it from the exhaust oxidizing gas.

A portion of the exhaust oxidizing gas path 26 which is downstream of the second water condenser 24B is tilted in a downward direction. From this downstream portion, a second recovered water path 57B branches in a downward direction. The lower end of the second recovered water path 57B is connected to a second recovered water tank 58B. In this configuration, the condensed water having been separated from the exhaust oxidizing gas in the second water condenser 24B flows in a downward direction through the exhaust oxidizing gas path 26 and then reaches the second recovered water tank 58B via the second recovered water path 57B and is stored therein. The exhaust oxidizing gas from which the condensed water has been removed in the second water condenser 24B flows through the exhaust oxidizing gas path 26 and is released to atmosphere from the tip end of the exhaust oxidizing gas path 26.

The first recovered water tank 58A and the second recovered water tank 58B communicate with each other at their lower parts via a communicating path. Although water is recovered from both of the exhaust fuel gas and the exhaust oxidizing gas, it may be recovered from either the exhaust fuel gas or the exhaust oxidizing gas.

As described above, the first water condenser 24A is constituted by a first heat exchanger for exchanging heat between the exhaust fuel gas and the hot water, while the second water condenser 24*b* is constituted by a second heat exchanger for exchanging heat between the exhaust oxidizing gas and the hot water. A hot water path 9A through which hot water is flowed to the two heat exchangers extends from, for example, the lower part of the hot water storage tank 9B, passes through these heat exchangers, and reaches the upper part of the hot water storage tank 9B. The hot water path 9A and the hot water storage tank 9B constitute a hot water circulating path 9 which is an example of the above stated "water circulating path." The hot water circulator 10 which is an example of the above stated water circulator, is disposed on the hot water path 9A. As the hot water circulator 10, for example, a pump or the like may be used. The hot water circulator 10 flows the hot water from the lower part toward the upper part of the hot water storage tank 9B during power generation of the fuel cell system 301. Which of the two heat exchangers (first water condenser 24A and second water condenser 24B) is located at upstream side on the hot water path 9A is arbitrary.

The reforming water path 64 is provided to extend from the second recovered water tank 58B to the reforming water inlet of the reformer 105. The reforming water path 64 is provided with a reforming water supplier 63 and a purifier 17. Which of the reforming water supplier 63 and the purifier 17 is located at upstream side is arbitrary. The reforming water supplier 63 is constituted by, for example, a plunger pump, or the like, and supplies the water (recovered water) from the first and second recovered water tanks 58A and 58B to the reformer 105 as the reforming water. The purifier 107 serves to purify water (in the present embodiment, reforming water), and is constituted by, for example, ion exchange resin filled. This lowers an electric conductivity of the reforming water.

A heater 14 which is an example of the above stated "heater" is provided at the lower portion of the casing 50. The heater 14 is constituted by, for example, a ceramic heater. The heater 14 is configured to operate by electric power externally supplied thereto from an electric power supply provided outside the fuel cell system 301, rather than from the fuel cell 1. In Embodiment 1, the heater 14 is provided to extend over a wide range in a plan view at the bottom portion of the casing 50. In this configuration, upon the actuation of the heater 14, the air warmed up by the heater 14 moves upward by natural convection and increases an ambient temperature in a region in the vicinity of the hot water circulating path 9. As a result, water in the hot water circulating path 9 is heated to prevent the water in the hot water circulating path 9 from freezing. That is, in Embodiment 1, the heater 14 indirectly heats the water in the hot water circulating path 9. Of course, the heater 14 may be configured to directly heat the water in the hot water circulating path 9. The operation of the heater 14 allows the water inside the first and second recovered water tanks 58A and 58B to be suppressed from freezing.

Next, a configuration of a control system will be described.

The fuel cell system 301 of Embodiment 1 includes a controller 16 which is an example of the above stated "controller." The controller 16 is constituted by, for example, a microcomputer. The controller 16 includes a calculator section and a memory section. The calculator section is constituted by, for example, a CPU in a microcomputer. The memory section is constituted by, for example, an internal memory in the microcomputer. In the memory section, a control program including freezing suppressing control at abnormal shut down as described later is stored. The calculator section reads this control program from the memory section and executes it to perform various kinds of control. Hereinafter, it is assumed that control executed by the calculator section is control executed by the controller 16. The controller 16 outputs control signals to desired components (61, 62, 6, 63, 10, etc.) in the fuel cell system 301 based on inputs from predetermined detectors and others (not shown), in the fuel cell system 301, thereby controlling the overall operation of the fuel cell system 301. In addition, the controller 16 controls the hot water circulator 10 and the heater 14 based on an input received from a first temperature detector 15, an input received from a second temperature detector 29 and an input received from a third temperature detector 30, thus executing freezing suppressing control at abnormal shut down of the fuel cell system 301. It should be noted that the controller 10 causes a water supply means which is not shown to make up for deficiencies in water, based on a detection signal received from a first recovered water level detector 31A and a detection signal received from a second recovered water level detector 31B, thereby controlling each of the water level in the first recovered water tank 58A and the water level in the second recovered water tank 58B to a value within a predetermined range. Alternatively, for example, the controller 16 may include a controller for controlling the overall operation of the fuel cell system 301 and a controller for performing freezing suppressing control at abnormal shut down of the fuel cell system 301.

The first recovered water level detector 31A detects the water level in the first recovered water tank 58A and outputs the detected water level to the controller 16. The second recovered water level detector 31B detects the water level in the second recovered water tank 58B and outputs the detected water level to the controller 16. The first recovered water level detector 31A and the second recovered water level detector 31B are each constituted by, for example, a water level sensor.

The first temperature detector 15 is an example of the above stated "temperature detector." In Embodiment 1, inside the casing 50, the first temperature detector 15 is disposed in a spot where the first temperature detector 15 indicates a temperature substantially equal to an outside temperature. In a shut-down state of the fuel cell system 301, the temperature of water in the hot water circulating path 9 changes according to the outside temperature. For this reason, the outside temperature is a parameter correlating with the temperature of water in the hot water circulating path 9, and the first temperature detector 15 is a "temperature detector" for indirectly detecting the temperature of the water in the hot water circulating path 9. Of course, the first temperature detector 15 may be provided to directly detect the temperature of the water in the hot water circulating path 9. The first temperature detector 15 outputs the detected temperature to the controller 6. Hereinafter, an example in which the first temperature detector 15 is constituted by a single temperature detector will be discussed. Alternatively, the first temperature detector 15 may be constituted by a plurality of temperature detectors which are used, for example, to control the hot water circulator 10 and to control the heater 14 separately, according to the uses. The same applies to other embodiments.

In Embodiment 1, the above second temperature detector 29 is provided to detect the temperature of the hot water on a location of the hot water path 9A which is upstream of the first and second water condensers 24A and 24B, while the third temperature detector 30 is provided to detect the temperature of the hot water on a location of the hot water path 9A which is downstream of the first and second water condensers 24A and 24B. The detected temperature of the second temperature detector 29 and the detected temperature of the third temperature detector 30 are output to the controller 16. The second temperature 29 and the third temperature detector 30 may be other means so long as they detect the temperature of the hot water directly or indirectly, and may be, for example, a temperature sensor such as a thermocouple.

The second temperature detector 29 and the third temperature detector 30 are an example of "first abnormality detector" for indirectly detecting "leakage of water", i.e., a parameter relating to "leakage of water". The temperature detected by the second temperature detector 29 and the temperature detected by the third temperature detector 30 are an example of the parameter relating to "leakage of water." If water leaks from the hot water circulating path 9, the flow rate of the hot water flowing through the hot water path 9A decreases. According to the decrease, an amount of a temperature increase of the hot water in a period of time when the hot water passes through the first and second condenser 24A and 24B increases. Accordingly, regarding a difference (hereinafter referred to as a detected temperature difference) between the temperature detected by the second temperature detector 29 and the temperature detected by the third temperature detector 30, a predetermined threshold (hereinafter referred to as the detected temperature threshold) greater than a detected temperature difference in a normal case (case where leakage of water does not occur), is set in the controller 16 (to be precise, memory section). The controller 16 determines that leakage of water (first abnormality) has occurred in the hot water circulating path 9, if the detected temperature difference becomes a value which is not lower than the detected temperature threshold. Thus, the controller 16 serves as a determiner for determining whether or not water is leaking. Note that the above identified second threshold is merely exemplary, and therefore, a value less than the detected temperature difference threshold in the normal case (where leakage of water does not occur) may be set as a value used to detect whether or not abnormality of water leakage has occurred, assuming that no hot water is circulated due to the fact that a large amount of water has leaked from the hot water circulating path 9.

[Operation]

First of all, a typical operation will be explained in brief.

The fuel cell system 301 has four operation modes, which are a power generation operation for generating electric power, a start-up operation for smoothly shifting the fuel cell system 301 from a shut-down state to the power generation operation, a shut-down operation for smoothly shifting the fuel cell system 301 from the power generation operation to the shut-down state, and the shut-down state. The shut-down state refers to a state after a shut-down process has completed, and includes a stand-by state in which the fuel cell system 301 is awaiting next-start up and an abnormal shut-down state in which the fuel cell system 301 is inhibited from performing next start-up.

In response to a start-up signal from the controller 16, the fuel cell system 301 starts-up. During the power generation operation, the reformer 105 generates hydrogen-containing gas by an autothermal method using the material gas supplied from the raw material supplier 61, the reforming water supplied through the reforming water path, and air supplied from the air supplier 62. The hydrogen-containing gas is supplied as the fuel gas to the internal fuel gas path 1a of the fuel cell 1. The oxidizing gas supplier 6 supplies oxidizing gas (air) to the cathode of the fuel cell 1. The fuel cell 1 performs power generation by causing the fuel gas and the oxidizing gas to chemically react with each other, which also results in heat. The fuel gas (exhaust fuel gas) and the oxidizing gas (exhaust oxidizing gas) which have not been consumed in the power generation, are finally released to atmosphere through the exhaust fuel gas path 25 and the exhaust oxidizing gas path 26, respectively. Before the exhaust fuel gas and the exhaust oxidizing gas are released to atmosphere, they are cooled in the first water condenser 24A and the second water condenser 24B, respectively, by transmission of heat owned by the exhaust fuel gas and heat owned by the exhaust oxidizing gas to the corresponding hot water, and thereby generate condensed water. The water is removed from the exhaust fuel gas and stored into the first recovered water tank 58A, while water is removed from the exhaust oxidizing gas and stored into the second recovered water tank 58B. The reforming water supplier 63 supplies the water (recovered water) from the first recovered water tank 58A and from the second recovered water tank 58B to the reformer 105 through the purifier 107. The water is used in the reformer 105 to reform the material gas. Meanwhile, the hot water receives heat owned by the exhaust fuel gas and the exhaust oxidizing gas and increases its temperature. The hot water with an increased temperature is stored in the hot water storage tank. In this way, the exhaust heat (waste) is recovered from the exhaust fuel gas and from the exhaust oxidizing gas and is stored in the hot water storage tank 9B.

In the above described manner, the fuel cell system 301 performs the power generation operation. After that, upon a shut-down signal being output from the controller 16, the fuel cell system 301 shifts to the shut-down operation. Upon the completion of the shut-down operation, the fuel cell system 301 enters the shut-down state.

In a normal shut-down state, when the temperature detected by the first temperature detector 15 becomes a value which is not higher than a first threshold, the fuel cell system 301 initiates the freezing suppressing operation, while when the temperature detected by the first temperature detector 15 becomes a value which is not lower than the third threshold, the fuel cell system 301 stops the freezing suppressing operation. The above normal shut-down state is defined as a shut-down state (stand-by state) which is not the shut-down state (abnormal shut-down state) resulting from occurrence of an abnormality in the fuel cell system. The freezing suppressing operation will be described in detail later.

In the middle of the start-up operation and the power generation operation, if the controller 16 detects an abnormality, the fuel cell system 301 carries out a predetermined abnormal shut-down process corresponding to a content of the detected abnormality. After the abnormal shut-down process completes, the fuel cell system 301 is typically placed in the abnormal shut-down state in which next start-up is not permitted.

Next, description will be given of the freezing suppressing control (hereinafter also referred to as freezing suppressing control at abnormal shut-down of the system) in the abnormal shut-down state of the fuel cell system 301 which has a feature of the present invention. This control is an example of control "which inhibits the above water circulation operation for suppressing freezing and which does not inhibit the above heating operation for suppressing freezing, in a case where the fuel cell system is shut down in response to detection of the first abnormality by the first abnormality detector." In the freezing suppressing control in the abnormal shut-down state of the system, the abnormalities of the fuel cell system 301 are treated such that abnormality (first abnormality) relating to leakage of water in the hot water circulating path 9 is distinct from abnormalities ("second abnormalities") different from the first abnormality.

Figure 2:
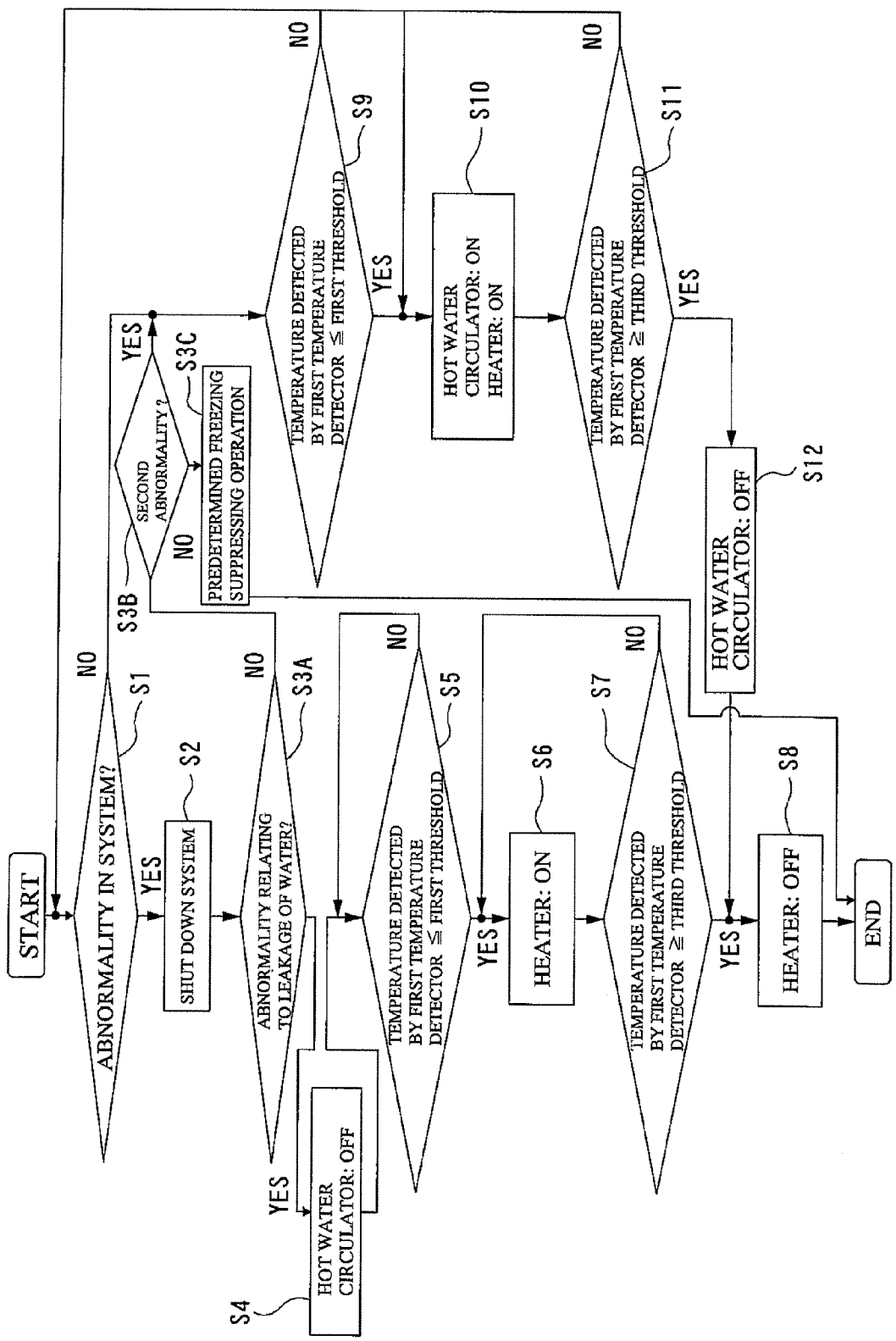
FIG. 2 is a flowchart showing a content of freezing suppressing control at abnormal shut down in the fuel cell system of FIG. 1.

FIG. 2 is a flowchart showing the content of the freezing suppressing control at the abnormality shut-down of the fuel cell system 301. This control is carried out by the controller 16.

As shown in FIG. 2, initially, the controller 16 determines whether or not an abnormality has occurred in the fuel cell system 301 (step S1).

If it is determined that there is no abnormality (NO in step S1), the controller 16 performs normal freezing suppressing control (step S9~step S12, 8). To be specific, the controller 16 determines whether or not the temperature detected by the first temperature detector 15 is not higher than a first threshold (step S9). The first threshold is defined as a temperature which is not lower than a freezing point (0 degree C.) of water. To be specific, as the first threshold, an optimal value is determined through an experiment, a simulation, etc.

If it is determined that the temperature detected by the first temperature detector 15 is higher than the first threshold, the controller 16 returns to step S1. Therefore, in this case, the freezing suppressing operation is not executed.

If it is determined that the temperature detected by the first temperature detector 15 is not higher than the first threshold, the controller 16 actuates the hot water circulator 10 and actuates the heater 14 as the freezing suppressing operation (step S10). As a result, the hot water in the hot heater tank 9B circulates through the hot water circulating path 9. In addition, the heater 14 increases the ambient temperature in the interior of the casing 50 to thereby heat the hot water in the hot water circulating path 9. According to an increase in the ambient temperature in the interior of the casing 50, the temperature detected by the first temperature detector 15 increases correspondingly.

Then, the controller 16 determines whether or not the temperature detected by the first temperature detector 15 is not lower than a third threshold (step S11). The third threshold is set to a temperature higher than the first threshold.

If it is determined that the temperature detected by the first temperature detector 15 is lower than the third threshold (NO in step S11), the controller 16 returns to step S16. Thus, the freezing suppressing operation is carried out until the temperature detected by the first temperature detector 15 reaches a temperature which is not lower than the third threshold, thereby suppressing the water in the hot water circulating path 9 from freezing.

If it is determined that the temperature detected by the first temperature detector 15 is not lower than the third threshold (YES in step S11), the controller 16 stops the hot water circulator 10 and the heater 14 (step S12 and step S8). As a result, the freezing suppressing operation is stopped.

On the other hand, if it is determined that an abnormality has occurred (YES in step S1), the controller 16 shuts down the fuel cell system 301 (step S2).

Then, the controller 16 determines whether or not the abnormality which has occurred is the abnormality (first abnormality) relating to leakage of water (step S3A). If it is determined that the abnormality which has occurred is not the abnormality relating to leakage of water (NO in step S3A), the controller 16 goes to step S3B and determines whether or not the abnormality which has occurred is the second abnormality. Specific examples of the second abnormality are listed in table 1. Since there are many second abnormalities, the second abnormality detectors for detecting the second abnormalities are not depicted in the drawings. The controller 16 determines whether or not the abnormality detected based on the output of the second abnormality detector is the second abnormality. If it is determined that abnormality detected based on the output of the second abnormality detector is the second abnormality (YES in step S3B), the controller 16 goes to step S9, and performs control identical to that in a state where there is no abnormality (stand-by state). In other words, if the abnormality which has occurred is an abnormality different from the abnormality relating to leakage of water, the controller 16 "does not inhibit a heating operation for suppressing freezing," for an abnormality (second abnormality), which is a part of the abnormalities different from the abnormality relating to leakage of water. Alternatively, a step in which the controller 16 does not inhibit the heating operation for suppressing freezing, or the controller 16 permits the heating operation for suppressing freezing, if the abnormality which has occurred is the second abnormality, may be provided before step S9. If it is determined that the abnormality is not the second abnormality (NO in step S3B), a predetermined freezing suppressing operation corresponding to the content of that abnormality is carried out. For example, if it is determined that an abnormality relating to leakage of combustible gas has occurred in step S1, a water circulating operation in the hot water circulating path 9 is performed, and the heating operation of the heater 14 is inhibited, when the detected temperature is not higher than the first temperature. The abnormality relating to the leakage of the combustible gas is typically detected by a combustible gas sensor (not shown) provided within the casing 50.

If it is determined that the abnormality which has occurred is the abnormality relating to leakage of water (YES in step S3A), the controller 16 stops the hot water circulator 10 (step S4). The fuel cell system has been shut down in step S2, and the hot water circulator 10 has typically already been stopped. Therefore, the phrase "the controller 16 stops the hot water circulator 10 in step S4" means that the controller 16 stops the hot water circulator 10 regardless of whether or not the hot water circulator 10 is operating. In other words, the controller 16 "inhibits the water circulating operation for suppressing freezing." This makes it possible to suppress damage of leakage of water from spreading and reduce a chance of a failure in the hot water circulator 10 which would be cause by operating the hot water circulator 10 without water.

Then, the controller 16 determines whether or not the temperature detected by the first temperature detector 15 is not higher than the first threshold (step S5). If it is determined that the temperature detected by the first temperature detector 15 is higher than the first threshold (NO in step S5), the controller 16 stands-by until the temperature detected by the first temperature detector 15 reaches a temperature which is not higher than the first threshold.

On the other hand, if it is determined that the temperature detected by the first temperature detector 15 is not higher than the first threshold, the controller 16 operates the heater 14 as the freezing suppressing operation (step S6). As a result, because of the operation of the heater 14, the ambient temperature in the interior of the casing 50 rises so as to heat water remaining in the hot water circulating path 9. Correspondingly, the temperature detected by the first temperature detector 15 increases.

Then, the controller 16 determines whether or not the temperature detected by the first temperature detector 15 is not lower than the third threshold (step S7). If the temperature detected by the first temperature detector 15 is lower than the third threshold (NO in step S7), the controller 16 returns to step S6. Thus, the freezing suppressing operation is carried out without circulating the hot water until the temperature detected by the first temperature detector 15 reaches a temperature which is not lower than the third threshold, thereby suppressing freezing of water remaining in the hot water circulating path 9 from which water is leaking.

If the temperature detected by the first temperature detector 15 is not lower than the third threshold (YES in step S7), the controller 16 stops the heater 14 (step S8). As a result, the freezing suppressing operation is stopped. In accordance with the fuel cell system 301 of the above embodiment, if the temperature detected by the first temperature detector 15 is not higher than the first threshold in the normal shut-down state and in the abnormal shut-down state which results from occurrence of the second abnormality, the hot water circulator 10 and the heater 14 are operated to carry out the freezing suppressing operation. However, the freezing suppressing operation is in no way limited to the above. For example, a configuration may be used, in which if the temperature detected by the first temperature detector 15 is not higher than a predetermined temperature threshold greater than the first threshold, the hot water circulator 19 is operated, and then when the temperature detected by the first temperature detector 15 decreases and reaches a temperature which not higher than the first threshold, the heater 14 is operated.

In accordance with the fuel cell system 301 of Embodiment 1 configured as described above, if water leaks from the hot water circulating path 9, it is possible to suppress damage of leakage of water from spreading and reduce a chance of a failure of the hot water circulator 10 which would be caused by operating the hot water circulator 10 without water. In addition, it is possible to suppress freezing of water remaining in the hot water circulating path 9 from which water is leaking.

Embodiment 2

In Embodiment 2 of the present invention, an amount of heating performed by the heater 14 is set larger in the freezing suppressing operation in a case where the first abnormality is detected in Embodiment 1.

A fuel cell system of Embodiment 2 is identical to the fuel cell system 301 of Embodiment 1 in a configuration of hardware, and is different from the fuel cell system 301 of Embodiment 1 in a configuration of a control system.

Figure 3:
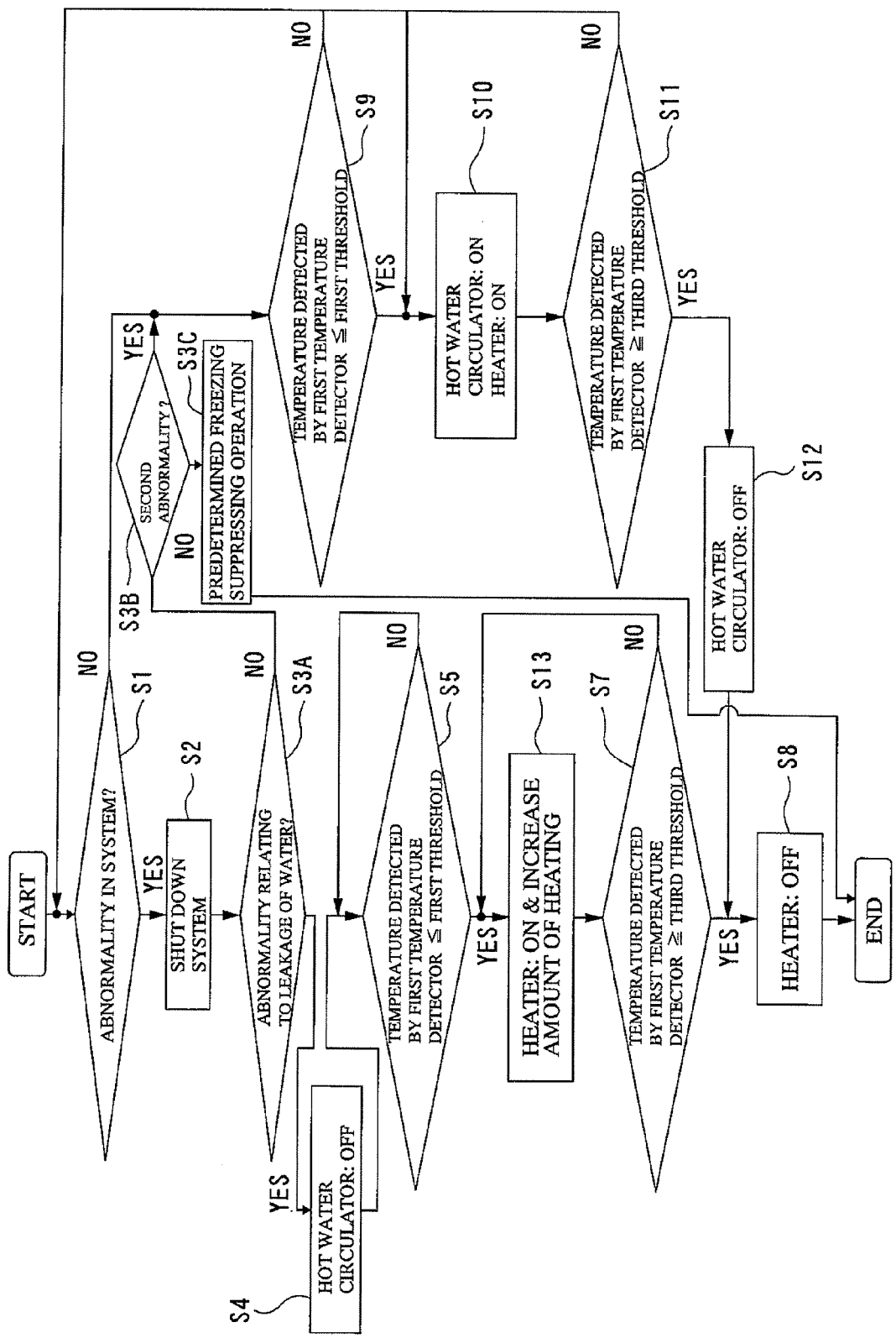
FIG. 3 is a flowchart showing a content of freezing suppressing control at abnormal shut down in a fuel cell system according to Embodiment 2 of the present invention.

FIG. 3 is a flowchart showing a content of freezing suppressing control at abnormal shut-down state in the fuel cell system according to Embodiment 2 of the present invention.

As shown in FIG. 3, in the freezing suppressing control in the abnormal shut-down state of the system of Embodiment 2 of the present invention, step S13 is performed instead of step 6 in Embodiment 1 (FIG. 2). In other respect, the freezing suppressing control at the abnormal shut-down of the system of Embodiment 2 is identical to that of Embodiment 1.

In step S13, the controller 16 operates the heater 14 in such a manner that the amount of heating performed by the heater 14 is larger than that in the normal shut-down state (stand-by state) or in the abnormal shut-down state which results from occurrence of the second abnormality (step S10). This makes it possible to prevent a reduction in an anti-freezing ability which is caused by non-execution of the water circulating operation as the freezing suppressing operation in the abnormal shut-down state after occurrence of the first abnormality.

Embodiment 3

In Embodiment 3 of the present invention, a temperature threshold of the first temperature detector 15 at which the heater 14 is actuated in the freezing suppressing operation in the abnormal shut-down state which results from occurrence of the first abnormality, is set higher than that in the freezing suppressing operation in in the normal shut-down state (stand-by state) or the abnormal shut-down state which results from occurrence of the second abnormality.

A fuel cell system of Embodiment 3 is identical to the fuel cell system 301 of Embodiment 1 in a configuration of hardware, and is different from the fuel cell system 301 of Embodiment 1 in a configuration of a control system.

Figure 4:
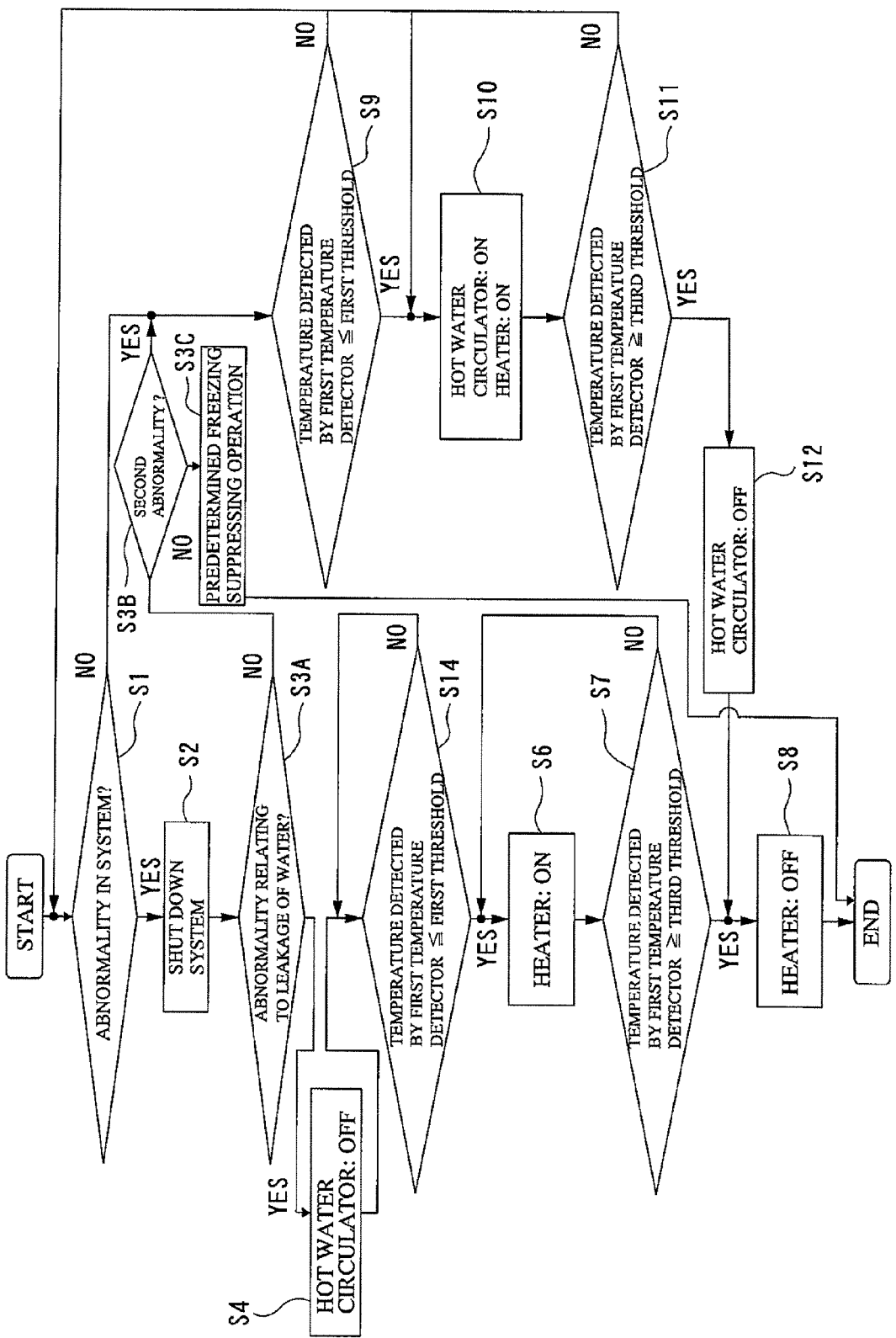
FIG. 4 is a flowchart showing a content of freezing suppressing control at abnormal shut down in a fuel cell system according to Embodiment 3 of the present invention.

FIG. 4 is a flowchart showing a content of freezing suppressing control in an abnormal shut-down state in the fuel cell system according to Embodiment 2 of the present invention.

As shown in FIG. 4, in the freezing suppressing control in the abnormal shut-down state of the fuel cell system of Embodiment 3 of the present invention, step S14 is performed instead of step S5 in the freezing suppressing control at abnormal shut-down of the system in Embodiment 1. In other respect, the freezing suppressing control at the abnormal shut-down of the system of Embodiment 3 is identical to that of Embodiment 1.

In step S14, the controller 16 determines whether or not the temperature detected by the first temperature detector 15 is not higher than the second threshold. In Embodiment 3, the first threshold is defined as a temperature with which it is determined that heating performed by the heater 14 is necessary to suppress freezing in a state where the water is circulated. The second threshold is defined as a temperature with which it is determined that heating performed by the heater 14 is necessary to suppress freezing in a state where the water is not circulated and is set higher than the first threshold. The first threshold and the second threshold depend on a design of the fuel cell system, and therefore are suitably determined by, for example, an experiment, a simulation, etc.

If it is determined that the temperature detected by the first temperature detector 15 is higher than the second threshold (NO in step S14), the controller 16 stands by until the temperature detected by the first temperature detector 15 reaches a temperature which is not higher than the second threshold.

On the other hand, if it is determined that the temperature detected by the first temperature detector 15 is not higher than the second threshold, the controller 16 operates the heater 14 as the freezing suppressing operation (step S6).

In accordance with the fuel cell system of Embodiment 3 configured as described above, if the abnormality relating to leakage of water is detected, it is possible to advance the start of the actuation of the heater 14 to address a temperature decrease in the hot water, because the temperature threshold of the first temperature detector 15 at which the heater 14 is actuated in the freezing suppressing operation in the case where the abnormality relating to leakage of water is detected, is set higher than that in the freezing suppressing operation in the normal shut-down state or in the abnormal shut-down state which results from occurrence of the second abnormality. This makes it possible to suppress water from freezing to address a reduction in an anti-freezing ability which is caused by non-execution of the water circulating operation as the freezing suppressing operation in the abnormal shut-down state which results from occurrence of the first abnormality.

Embodiment 4

In Embodiment 4 of the present invention, there are three "water circulating paths," "fuel cell" is a polymer electrolyte fuel cell, and "fuel cell system" includes a hydrogen generator as a fuel gas supplier.

[Configuration]

Figure 5:
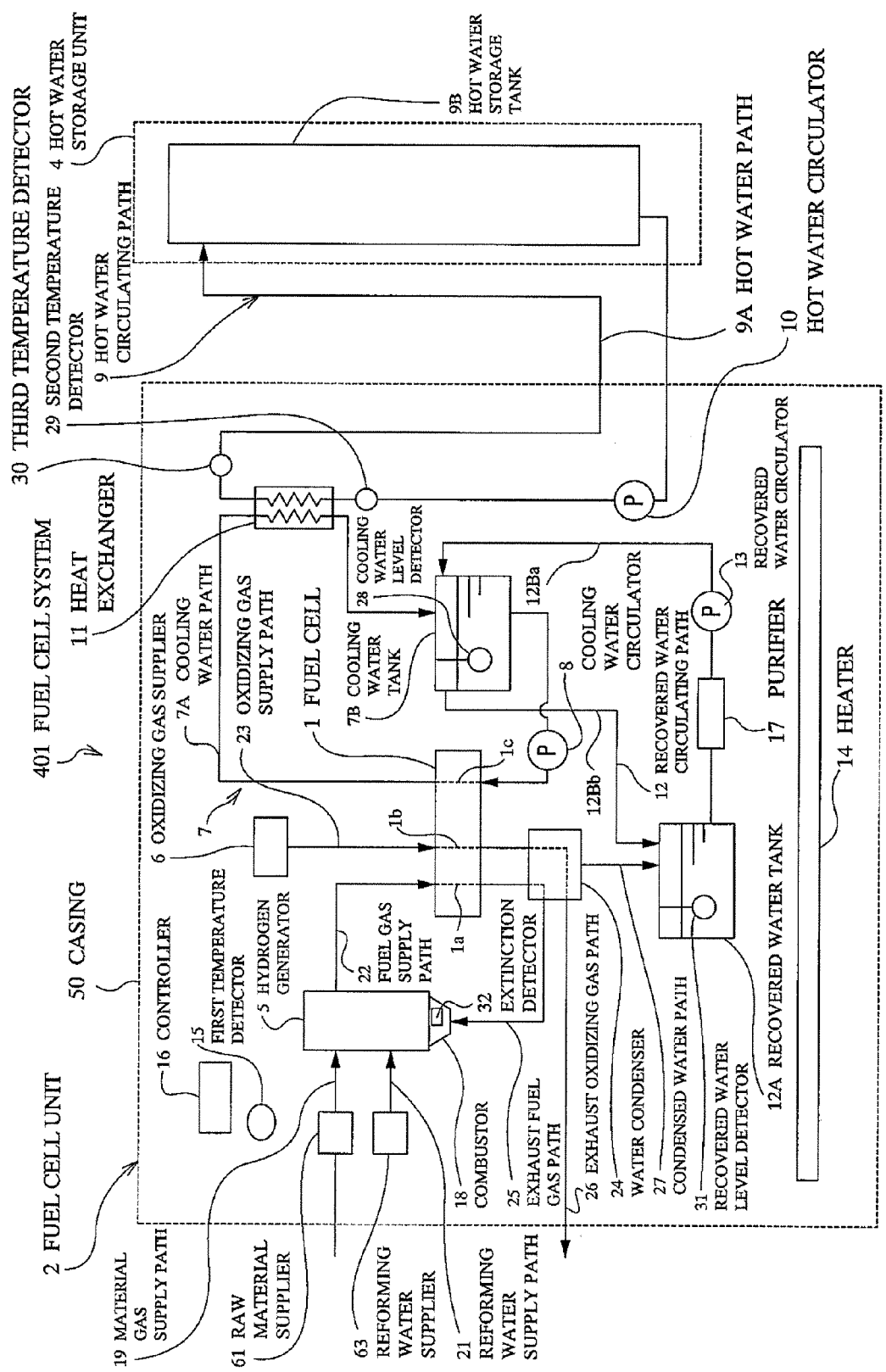
FIG. 5 is a block diagram showing a configuration of a fuel cell system according to Embodiment 4 of the present invention.

FIG. 5 is a block diagram showing a configuration of the fuel cell system according to Embodiment 4 of the present invention.

Firstly, a configuration of hardware will be described.

As shown in FIG. 5, a fuel cell system 401 of Embodiment 4 includes a fuel cell unit 2 and a hot water storage unit 4. The hot water storage unit 4 includes the hot water storage tank 9B.

The fuel cell unit 2 includes the casing 50. The casing 50 has an inlet and an outlet which are not shown. The casing 50 accommodates components (except for casing 50) constituting the fuel cell unit 2.

Inside the casing 50, the fuel cell 1 is disposed. In Embodiment 4, the fuel cell 1 is constituted by the polymer electrolyte fuel cell. The outlet of a hydrogen generator 5 is connected to the inlet of the internal fuel gas channel 1a of the fuel cell 1 via a fuel gas supply path 22. Since the configuration of the hydrogen generator 5 is well known, it will be described in brief. The hydrogen generator 5 includes, for example, a reformer (not shown) and a carbon monoxide reducer (not shown). The reformer generates hydrogen-containing gas through a steam reforming reaction between the material gas and the reforming water. The carbon monoxide reducer reduces a carbon monoxide concentration of the hydrogen-containing gas to a predetermined level. The hydrogen-containing gas, the carbon monoxide concentration of which has been reduced, is supplied as the fuel gas to the fuel gas supply path 22 through the outlet of the hydrogen generator 5.

The raw material supplier 61 is connected to the material gas inlet of the hydrogen generator 5 via a material gas supply path 19. The reforming water supplier 63 is connected to the reforming water inlet of the hydrogen generator 5 via a reforming water supply path 2L The reforming water supplier 63 uses, for example, city water, recovered water, etc., as a water source, and is constituted by, for example, a plunger pump, etc.

The reformer of the hydrogen generator 5 is configured to be heated by a combustor 18. A heater 18 combusts the exhaust fuel gas to generate combustion heat to heat the reformer of the hydrogen generator 5. This heat is used for the steam reforming reaction.

The oxidizing gas supplier 6 is connected to the inlet of the internal oxidizing gas passage 1b in the fuel cell 1 via the oxidizing gas supply path 23.

The heater 18 is connected to the outlet of the internal fuel gas passage 1a in the fuel cell 1 via the exhaust fuel gas path 25.

The upstream end of the exhaust oxidizing gas path 26 is connected to the outlet of the internal oxidizing gas passage 1*b* in the fuel cell 1. The downstream end of the exhaust oxidizing gas path 26 is released to atmosphere.

A water condenser 24 is provided between the exhaust fuel gas path 25 and the exhaust oxidizing gas path 26. The exhaust fuel gas flowing through the exhaust fuel gas path 25 is supplied to the heater 18 after water is removed therefrom in the water condenser 24. The exhaust oxidizing gas flowing through the exhaust oxidizing gas path 26 is released to atmosphere after water is removed therefrom in the water condenser 24.

The recovered water tank 12A is connected to the water condenser 24 via a condensed water path 27. The water having been removed from the exhaust fuel gas and the water having been removed from the exhaust oxidizing gas flow to the recovered water tank 12A via the condensed water path 27 and are stored therein.

The fuel cell 1 is provided with an internal cooling water passage 1*c* to allow cooling water to flow uniformly over the entire fuel cell 1. Inside the casing 50, a cooling water path 7A is provided to include the internal cooling water passage 1*c*. The cooling water path 7A extends out from the lower part of the cooling water tank 7B to the upper part of the cooling water tank 7B through the fuel cell 1 (a portion through which the path 7A passes is the cooling water path 1*c*). The cooling water circulator 8 described later circulates the cooling water through the cooling water path 7A in such a way that the cooling water flows out from the lower part of the cooling water tank 7B and returns to the upper part of the cooling water tank 7B. The cooling water path 7A and the cooling water tank 7B constitute the cooling water circulating path 7 which is an example of the above stated "water circulating path." A cooling water circulator 8 which is an example of the above "water circulator" is provided at a portion of the cooling water path 7A which is upstream of the fuel cell 1. The cooling water circulator 8 is constituted by, for example, a pump. A heat exchanger 11 is provided at a portion of the cooling water path 7A which is downstream of the fuel cell 1. The heat exchanger 11 is configured to exchange heat between the cooling water flowing through the cooling water path 7A and the hot water flowing through the hot water path 9A. In this configuration, upon the actuation of the cooling water circulator 10, the cooling water from the cooling water tank 7B flows through the fuel cell 1 while cooling the fuel cell 1 and recovering exhaust (waste) heat therefrom. The heat exchanger 11 exchanges heat between the cooling water with an increased temperature and the hot water in such a way that the cooling water transfers the exhaust heat to the hot water and is thereby cooled. After that, the cooling water returns to the cooling water tank 7B.

The fuel cell system 401 is provided with the hot water path 9A through which hot water is flowed to the heat exchanger 11. The hot water path 9A and the hot water storage tank 9B constitute the hot water circulating path 9 which is an example of the above stated "water circulating path." Since the hot water circulating path 9 is identical to the hot water circulating path 9 of Embodiment 1, it will not be discussed repetitively.

The cooling water tank 7B is positioned above the recovered water tank 12A. The cooling water tank 7B and the recovered water tank 12A are connected to each other by means of a recovered water path 12B. For example, the recovered water path 12B includes a recovered water outward path 12Ba extending from the recovered water tank 12A to the cooling water tank 7B, and a recovered water return path 12Bb extending from an overflow opening (not shown) of the cooling water tank 7B to the recovered water tank 12A. The recovered water outward path 12Ba is provided with the purifier 17 and the recovered water circulator 13 which is an example of the above stated "water circulator." The recovered water circulator 13 is constituted by, for example, a pump. In this configuration, upon the actuation of the recovered water circulator 13, the recovered water from the recovered water tank 12A is purified by the purifier 17 and is supplied to the cooling water tank 7B. Surplus recovered water (cooling water) returns to the recovered water tank 12A through the overflow opening. In this configuration, cooling water for making up for a loss due to vaporization or the like is supplied from the recovered water tank 12A to the cooling water tank 7B. The water from the cooling water tank 7B is circulated through the circulating path 12 and purified by the purifier 17, so that its electric conductivity is lowered. The recovered water path 12B, the recovered water tank 12A, and the cooling water tank 7B configured as described above constitute the recovered water circulating path 12 which is an example of the above stated "water circulating path."

The heater 14 is provided at the bottom part of the casing 50.

Next, the configuration of the control system will be described.

The configuration of the control system in the fuel cell system 401 of Embodiment 4 has a configuration which is basically the same as that of the configuration of the control system in the fuel cell system 301 of Embodiment 1 except for the following difference. The difference will be described hereinafter.

The fuel cell system 401 of Embodiment 4 includes three "water circulating paths", i.e., the cooling water circulating path 7, the hot water circulating path 9, and the recovered water circulating path 12. These water circulating paths are controlled in the freezing suppressing control at abnormal shut down of the system.

The cooling water tank 7B is provided with a cooling water level detector 28 for detecting a water level in the cooling water tank 7B. The water level detected by the cooling water level detector 28 is output to the controller 16. The recovered water tank 12A is provided with a recovered water level detector 31 for detecting the water level in the recovered water tank 12A. The water level detected by the recovered water level detector 31 is output to the controller 16. The cooling water level detector 28 and the recovered water level detector 31 are constituted by, for example, water level sensors.

The cooling water level detector 28 and the recovered water level detector 31 are an example of "first abnormality detector" for indirectly detecting "leakage of water." The cooling water level detector 28 detects the water level in the cooling water tank 7B and outputs the detected water level to the controller 16. The water level in the cooling water tank 7B is an example of a parameter relating to "leakage of water" and is lowered if water leaks from the cooling water circulating path 7. Accordingly, a predetermined threshold (hereinafter referred to as first water leakage level threshold) of the water level in the cooling water tank 7B is set in the controller 16 (to be precise, memory section). If it is detected that the water level in the cooling water tank 7B is not higher than the first water leakage level threshold, the controller 16 determines that leakage of water (first abnormality) has occurred in the cooling water circulating path 7.

The recovered water level detector 31 detects the water level in the recovered water tank 12A and outputs the detected water level to the controller 16. The water level in the recovered water tank 12A is an example of a parameter relating to "leakage of water" and is lowered if water leaks from the recovered water circulating path 12. Accordingly, a predetermined threshold (hereinafter referred to as second water leakage level threshold) of the water level in the recovered water tank 12A is set in the controller 16 (to be precise memory section). If the water level in the recovered water tank 12A is not more than the second water leakage level threshold, the controller 16 determines that leakage of water (first abnormality) has occurred in the recovered water circulating path 12.

The second temperature detector 29 for detecting the temperature of the hot water and the third temperature detector 30 for detecting the temperature of the hot water are provided in a location of the hot water path 9A which is upstream of the heat exchanger 11 and in a location of the hot water path 9A which is upstream of the heat exchanger 11, respectively. The temperature detected by the second temperature detector 29 and the temperature detected by the third temperature detector 30 are output to the controller 16. A principle of detecting the first abnormality in the hot water circulating path 9 based on the temperature detected by the second temperature detector 29 and the temperature detected by the third temperature detector 30 has been already described in Embodiment 1 and will not be described repetitively.

The combustor 18 is provided with an extinction detector 32 for detecting an extinction in the combustor 18. The extinction is an example of the above stated "second abnormality," and the extinction detector 32 is an example of the above stated "second abnormality detector." The signal detected by the extinction detector 32 is input to the controller 16. When the extinction detector 32 detects an extinction, the controller 16 shuts down the fuel cell system 401.

In other respects, Embodiment 4 is identical to Embodiment 1.

[Operation]

A typical operation of the fuel cell system 401 of Embodiment 4 is identical to that of Embodiment 1 as described above and will not be described repetitively.

Next, the freezing suppressing control at the abnormal shut down of the system will be described.

Figure 6:
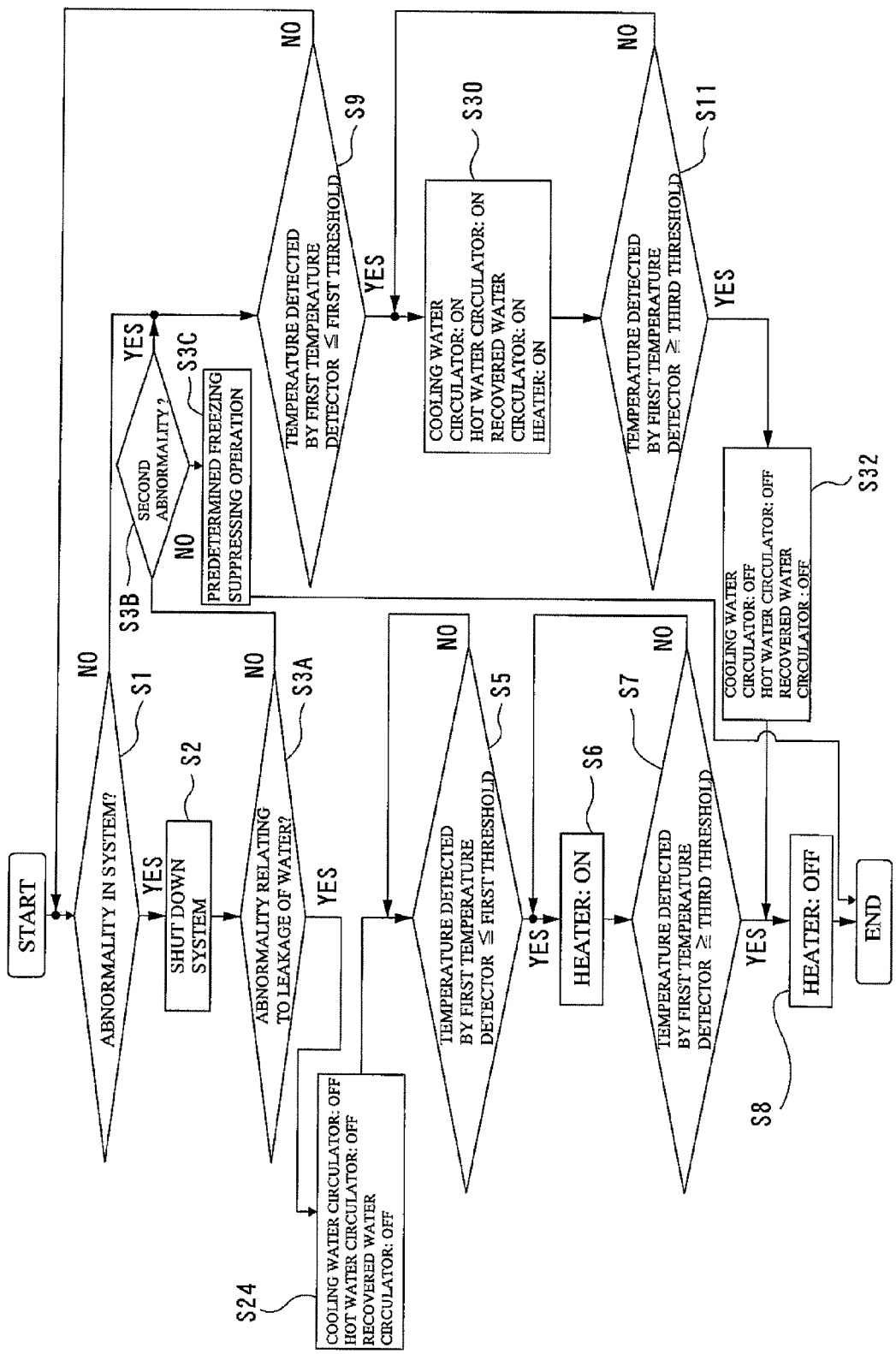
FIG. 6 is a flowchart showing a content of freezing suppressing control at abnormal shut down in the fuel cell system of FIG. 5.

FIG. 6 is a flowchart showing a content of freezing suppressing control at abnormal shut down in the fuel cell system 401.

As shown in FIG. 6, in Embodiment 4, three "water circulating paths", i.e., the cooling water circulating path 7, the hot water circulating path 9, and the recovered water circulating path 12 are targets to be controlled in the freezing suppressing control at abnormal shut down of the system, instead of one "water circulating path" consisting of the hot water circulating path 9 in Embodiment 1. In other respect, the freezing suppressing control at the abnormal shut down of the system of Embodiment 4 is identical to that of Embodiment 1.

To be specific, in the flowchart of FIG. 6, step S24 is performed instead of step S4 in the flowchart of FIG. 2 in Embodiment 1. In step S24, the cooling water circulator 8, the hot water circulator 10, and the recovered water circulator 13 are stopped. In other words, the operation of the cooling water circulator 8, the operation of the hot water circulator 10, and the operation of the recovered water circulator 13 are inhibited.

In addition, step S30 is performed, instead of step S10 in the flowchart of FIG. 2. In step S30, the cooling water circulator 8, the hot water circulator 10, and the recovered water circulator 13 are operated, and the heater 14 is operated.

Further, step S32 is performed, instead of step S12 in the flowchart of FIG. 2. In step S32, the cooling water circulator 8, the hot water circulator 10, and the recovered water circulator 13 are stopped.

In accordance with the fuel cell system 401 of Embodiment 4 configured as described above, if water leaks from at least one of the cooling water circulating path 7, the hot water circulating path 9, and the recovered water circulating path 12, it is possible to suppress damage of leakage of water from spreading and reduce a chance of a failure of the water circulator corresponding to the water circulating path, from which water is leaking, by operating the water circulator without water. In addition, it is possible to suppress freezing of the water remaining in the water circulating path from which water is leaking.

Embodiment 5

In Embodiment 5 of the present invention, the amount of heating performed by the heater 14 is set larger in the freezing suppressing operation in the case where the first abnormality is detected, in Embodiment 4.

A fuel cell system of Embodiment 5 is identical to the fuel cell system 401 of Embodiment 4 in a configuration of hardware, and is different from the fuel cell system 401 of Embodiment 4 in a configuration of a control system.

Figure 7:
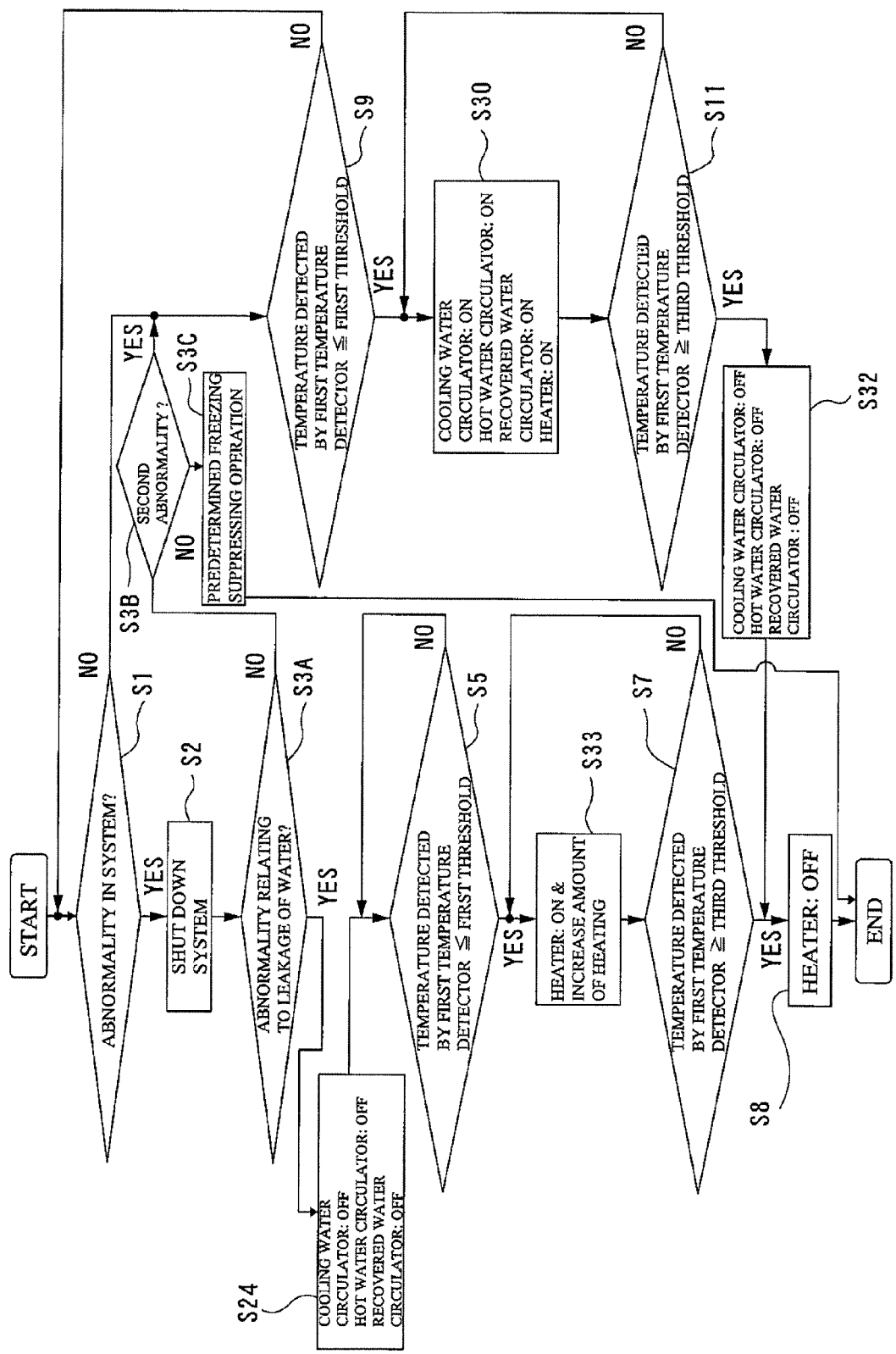
FIG. 7 is a flowchart showing a content of freezing suppressing control at abnormal shut down in a fuel cell system according to Embodiment 5 of the present invention.

FIG. 7 is a flowchart showing a content of freezing suppressing control at abnormal shut down in the fuel cell system according to Embodiment 2 of the present invention.

As shown in FIG. 7, in the freezing suppressing control at the abnormal shut down of the system of Embodiment 5 of the present invention, step S33 is performed instead of step S6 in Embodiment 4 (FIG. 6). In other respect, the freezing suppressing control at the abnormal shut down of the system of Embodiment 5 is identical to that of Embodiment 4.

In step S33, the controller 16 operates the heater 14 in such a manner that the amount of heating performed by the heater 14 is larger than the amount of heating performed by the heater 14 in the freezing suppressing operation in the normal shut-down state (stand-by state) or in the abnormal shut-down state which results from occurrence of the second abnormality (step S30). This makes it possible to prevent a reduction in an anti-freezing ability which would be caused by non-execution of the water circulating operation.

Embodiment 6

In Embodiment 6 of the present invention, the temperature threshold of the first temperature detector 15 at which the heater 14 is actuated in the freezing suppressing operation in the case where the first abnormality is detected, is set higher than that in the freezing suppressing operation in the case where the abnormality relating to leakage of water is not detected.

A fuel cell system of Embodiment 6 is identical to the fuel cell system 401 of Embodiment 4 in a configuration of hardware, and is different from the fuel cell system 401 of Embodiment 4 in a configuration of a control system.

Figure 8:
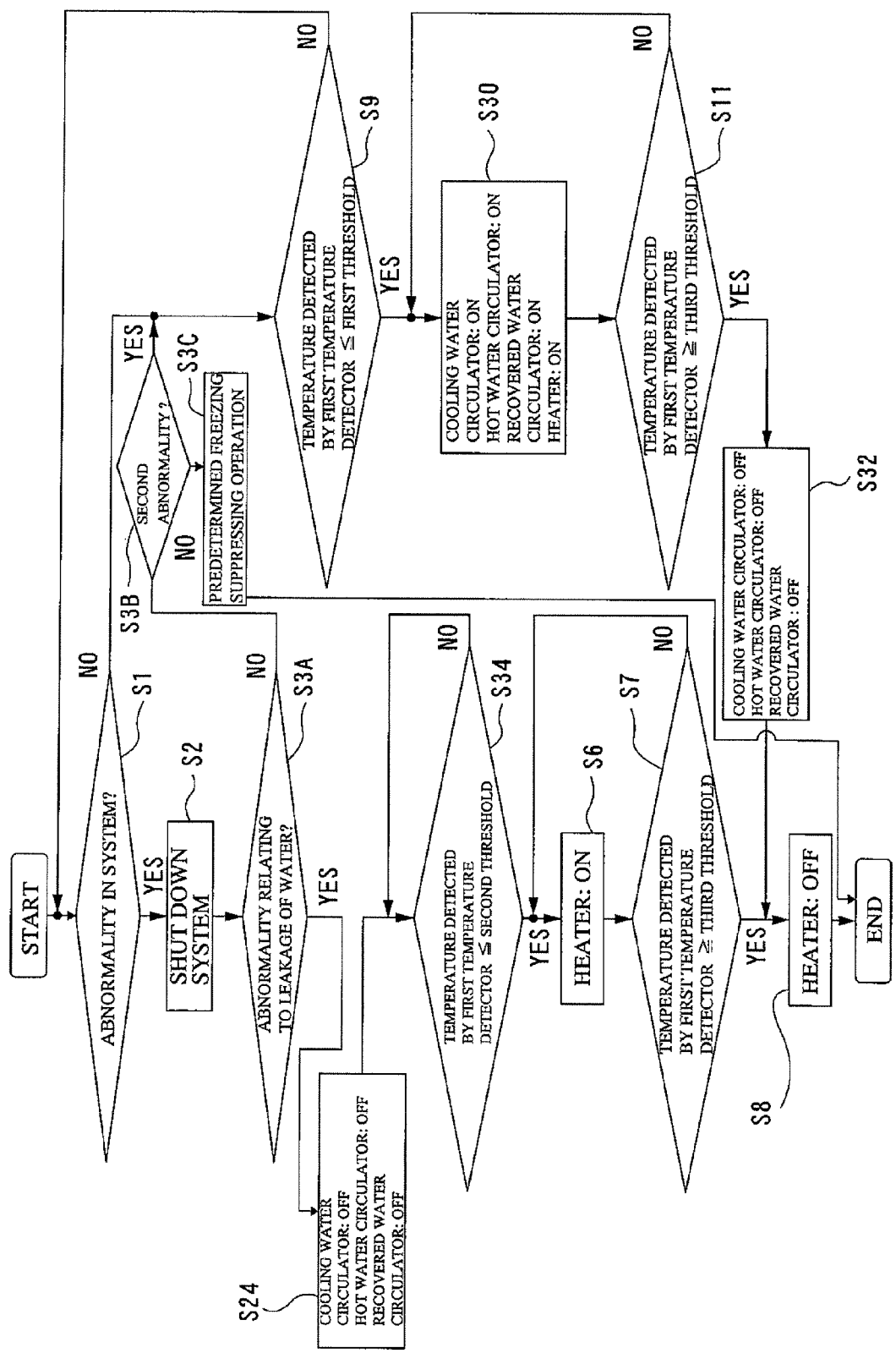
FIG. 8 is a flowchart showing a content of freezing suppressing control at abnormal shut down in a fuel cell system according to Embodiment 6 of the present invention.

FIG. 8 is a flowchart showing a content of freezing suppressing control at abnormal shut down in the fuel cell system according to Embodiment 6 of the present invention.

As shown in FIG. 8, step S34 is performed instead of step S5 in the freezing suppressing control at the abnormal shut down of the system of Embodiment 4. In other respect, the freezing suppressing control at the abnormal shut down of the system of Embodiment 6 is identical to that of Embodiment 4.

In step S34, the controller 16 determines whether or not the temperature detected by the first temperature detector 15 is not higher than a second threshold. In the present embodiment, the first threshold is defined as a temperature which is not lower than a freezing point of water. The second threshold is defined as a temperature higher than the first threshold. The first threshold and the second threshold depend on a system design of the fuel cell system, and therefore, are determined by, for example, an experiment, a simulation, etc.

If it is determined that the temperature detected by the first temperature detector 15 is higher than the second threshold (NO in step S34), the controller 16 stands by until the temperature detected by the first temperature detector 15 reaches a temperature which is not higher than the second threshold.

If it is determined that the temperature detected by the first temperature detector 15 is not higher than the second threshold, the controller 16 operates the heater 14 as the freezing suppressing operation (step S6).

In accordance with the fuel cell system of Embodiment 6 configured as described above, the temperature threshold of the first temperature detector 15 at which the heater 14 is actuated in the freezing suppressing operation in the abnormal shut-down state in response to detection of the abnormality relating to leakage of water, is set higher than that in the freezing suppressing operation in the normal shut-down state or in the abnormal shut-down state which (stand-by state) results from occurrence of the second abnormality. Because of this, it is possible to advance the start of the actuation of the heater 14 to address a decrease in the temperature of the cooling water, a decrease in the temperature of the recovered water and a decrease in the temperature of the hot water, in the abnormal shut-down state which results from occurrence of the first abnormality. This makes it possible to suppress a reduction in an anti-freezing ability which would be caused by the fact that the circulating operation of the cooling water, the recovered water and the hot water as the freezing suppressing operation is not executed in the abnormal shut-down state which results from occurrence of the first abnormality.

Embodiment 7

In Embodiment 7 of the present invention, "heater" for heating three "water circulating paths" is replaced by three "heaters" for heating the three "water circulating paths, respectively."

[Configuration]

Figure 9:
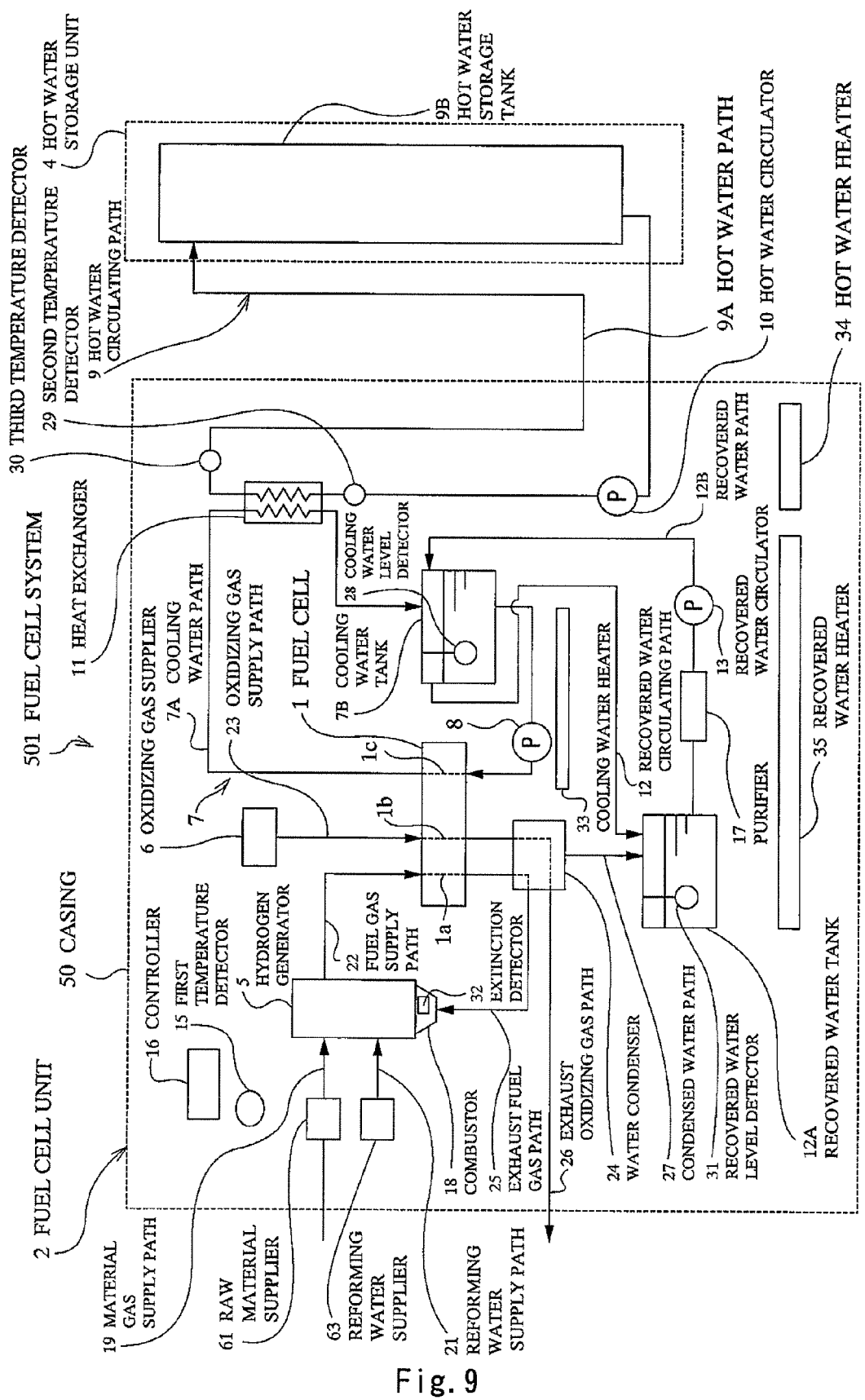
FIG. 9 is a block diagram showing a configuration of a fuel cell system according to Embodiment 7 of the present invention.

FIG. 9 is a block diagram showing a configuration of a fuel cell system according to Embodiment 7 of the present invention.

A fuel cell system 501 of Embodiment 1 is different in a configuration of hardware from the fuel cell system 401 of Embodiment 4 in that the fuel cell system 501 includes a cooling water heater 33 for heating water in the cooling water circulating path 7, a hot water heater 34 for heating water in the hot water circulating path 9, and a recovered water heater 35 for heating water in the recovered water circulating path 12, instead of one heater 14 in the fuel cell system 401 of Embodiment 4. In other respects, the fuel cell system 501 of Embodiment 7 is identical to the fuel cell system 401 of Embodiment 4.

The cooling water heater 33, the hot water heater 34, and the recovered water heater 35 are positioned below the cooling water circulating path 7, the hot water circulating path 9, and the recovered water circulating path 12, respectively, and are constituted by, ceramic heaters, etc., respectively. The cooling water heater 33, the hot water heater 34, and the recovered water heater 35 are each configured to be supplied with electric power from an electric power supply outside the fuel cell system 501. This allows each of the cooling water circulating path 7, the hot water circulating path 9, and the recovered water circulating path 12 to be cooled properly. In addition, the amount of heating per heater can be reduced.

In Embodiment 7 of the present invention, the water circulating path in which the abnormality relating to "leakage of water" is detected, among the cooling water circulating path 7, the hot water circulating path 9, and the recovered water circulating path 12, and the corresponding water circulator and heater, are the above stated "first water circulating path," "first water circulator," and "first heater," respectively, while the water circulating path in which the abnormality relating to "leakage of water" is not detected, and the corresponding water circulator and heater, are the above stated "second water circulating path," "second water circulator," and "second heater," respectively.

In the fuel cell system 501 of Embodiment 7, in the configuration of the control system, the controller 16 is configured to control the operation of the cooling water heater 33, the operation of the hot water heater 34, and the operation of the recovered water heater 35, instead of the "heater"14 in the fuel cell system 401 of Embodiment 4. In other respect, the fuel cell system 501 of Embodiment 7 is identical to the fuel cell system 401 of Embodiment 4.

[Operation]

Hereinafter, the operation of the fuel cell system of Embodiment 7 configured as described above will be described.

A typical operation of the fuel cell system of Embodiment 7 is similar to that of the fuel cell system of embodiment 4, and therefore will not be described repetitively, but only the freezing suppressing operation control at the abnormal shut down of the system will be described.

The freezing suppressing operation control at the abnormal shut down of the system of Embodiment 7 is an example of control in which "the first water circulator is inhibited from performing the water circulating operation for suppressing freezing in the first water circulating path, the first heater is not inhibited from performing the heating operation for suppressing freezing in the first water circulating path, the second water circulator is not inhibited from performing the water circulating operation for suppressing freezing in the second water circulating path, and the second heater is not inhibited from performing the heating operation for suppressing freezing in the second water circulating path, if leakage of water from the first water circulating path is detected by the first abnormality detector as the first abnormality, but leakage of water from the second water circulating path is not detected, and the fuel cell system is shut down.

Figure 10:
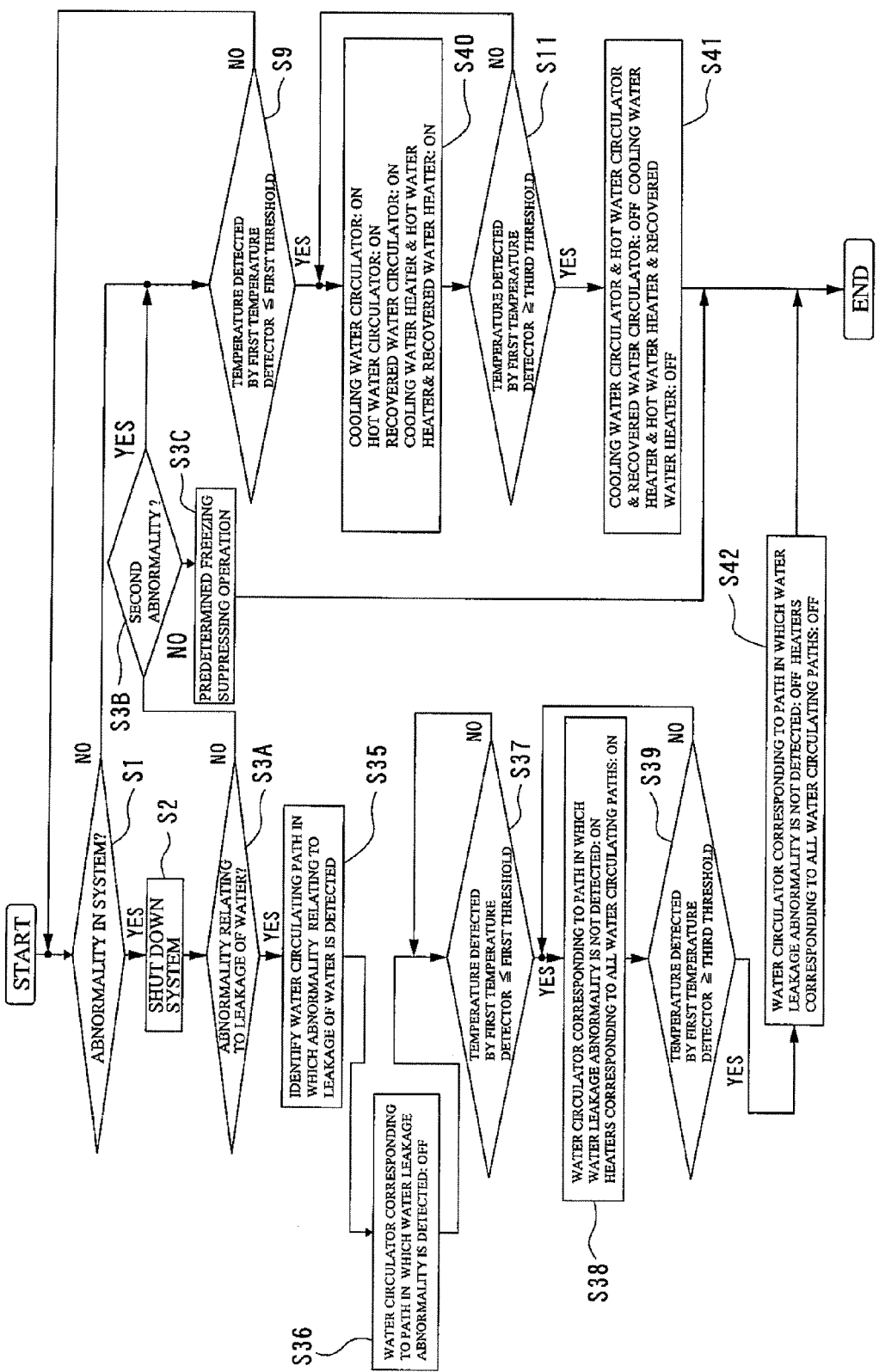
FIG. 10 is a flowchart showing a content of freezing suppressing control at abnormal shut down in the fuel cell system of FIG. 9.

FIG. 10 is a flowchart showing a content of the freezing suppressing control at abnormal shut down in the fuel cell system 501.

Referring to FIG. 10, initially, the controller 16 determines whether or not an abnormality has occurred in the fuel cell system 501 (step S1).

If it is determined that no abnormality has occurred (NO in step S1), the controller 16 executes normal freezing suppressing control (step S9, S40, S11, S41). To be specific, the controller 16 determines whether or not the temperature detected by the first temperature detector 15 is not higher than the first threshold (step S9). The first threshold is defined as a temperature not less than the freezing point of water (0 degree). To be specific, the first threshold is decided by an experiment, a simulation, etc.

If it is determined that the temperature detected by the first temperature detector 15 is higher than the first threshold, the controller 16 returns to step S1. In this case, therefore, the freezing suppressing operation is not carried out.

If it is determined that the temperature detected by the first temperature detector 15 is not higher than the first threshold, the controller 16 operates the cooling water circulator 8, the hot water circulator 10 and the recovered water circulator 13, and operates the cooling water heater 33, the hot water heater 34, and the recovered water heater 35, in the freezing suppressing operation (step S40). As a result, the water from the cooling water tank 7B is circulated through the cooling water circulating path 7, the water from the hot water storage tank 9B is circulated through the hot water circulating path 9, and the water from the recovered water tank 12A circulates the recovered water circulating path 12. The cooling water heater 33, the hot water heater 34 and the recovered water heater 35 cause ambient temperature in the interior of the casing 50 to increase, thereby heating the water in the cooling water circulating path 7, the water in the hot water circulating path 9, and the water in the recovered water circulating path 12. With an increase in the ambient temperature in the interior of the casing 50, the temperature detected by the first temperature detector 15 increases.

Then, the controller 16 determines whether or not the temperature detected by the first temperature detector 15 is not lower than the third threshold (step S11). The third threshold is set to a temperature higher than the first threshold.

If the temperature detected by the first temperature detector 15 is lower than the third threshold (NO in step S11), the controller 16 returns to step S40. As a result, the freezing suppressing operation is carried out until the temperature detected by the first temperature detector 15 reaches a temperature which is not lower than the third threshold, thereby suppressing freezing of the water in the cooling water circulating path 7, the water in the hot water circulating path 9, and the water in the recovered water circulating path 12.

If the temperature detected by the first temperature detector 15 is not lower than the third threshold (YES in step S11), the controller 16 stops the cooling water circulator 8, the hot water circulator 10 and the recovered water circulator 13, and stops the cooling water heater 33, the hot water heater 34, and the recovered water heater 35 (step S41). In this manner, the freezing suppressing operation is stopped.

On the other hand, if it is determined that an abnormality has occurred (YES in step S1), the controller 16 shuts down the fuel cell system 501 (step S2).

Then, the controller 16 determines whether or not the abnormality which has occurred is the abnormality (first abnormality) relating to leakage of water (step S3A). If it is determined that the abnormality which has occurred is not the abnormality relating to leakage of water (NO in step S3A), the controller 16 goes to step S3B and determines whether or not the abnormality which has occurred is the second abnormality. Specific examples of the second abnormality are listed in table 1. Since there are many second abnormalities, the second abnormality detectors for detecting the second abnormalities are not depicted in the drawings. The controller 16 determines, based on the output of the second abnormality detector, whether or not the abnormality detected is the second abnormality. If it is determined that the abnormality detected is the second abnormality (YES in step S3B), the controller 16 goes to step S9, and performs control identical to that in a state where there is no abnormality (stand-by state). In other words, if the abnormality which has occurred is an abnormality different from the abnormality relating to leakage of water, the controller 16 "does not inhibit the heating operation for suppressing freezing," to address the abnormality (second abnormality) which is at least a part of the abnormalities different from the abnormality relating to leakage of water. Alternatively, a step in which the controller 16 does not inhibit a heating operation for suppressing freezing, or the controller 16 permits the heating operation for suppressing freezing, if the abnormality which has occurred is the second abnormality, may be provided before step S9. If it is determined that the abnormality detected is not the second abnormality (NO in step S3B), a predetermined freezing suppressing operation corresponding to the content of that abnormality is carried out.

If it is determined that the abnormality which has occurred is the abnormality relating to leakage of water (YES in step S3A), the controller 16 identifies the water circulating path in which the abnormality relating to leakage of water has occurred (step S35). The controller 16 identifies the detector which has detected the abnormality relating to leakage of water, from among the cooling water level detector 28, the second water temperature 29, the third water temperature 30, and the recovered water level detector 31, thereby identifying the water circulating path in which the abnormality relating to leakage of water has occurred.

Then, the controller 16 stops the water circulator 20 corresponding to the identified water circulating path (water circulating path in which leakage of water is detected) (step S36). In other words, the controller 16 "inhibits the water circulating operation for suppressing freezing." This makes it possible to suppress damage of leakage of water from spreading in the water circulating path from which water is leaking, and reduce a chance of a failure of the water circulator corresponding to the water circulating path from which water is leaking.

Then, the controller 16 determines whether or not the temperature detected by the first temperature detector 15 is not higher than the first threshold (step S37). If it is determined that the temperature detected by the first temperature detector 15 is higher than the first threshold (NO in step 37), the controller 16 stands by until the temperature detected by the first temperature detector 15 reaches a temperature which is not higher than the first threshold.

On the other hand, if it is determined that the temperature detected by the first temperature detector 15 is not higher than the first threshold, the controller 16 operates the water circulator corresponding to the water circulating path in which the water leakage abnormality is not detected, as the freezing suppressing operation. In addition, the controller 16 operates all of the heaters 33, 34, and 35 (step S38). As a result, all of the heaters 33, 34, and 35 cause the ambient temperature in the interior of the casing 50 to increase, thereby heating water in the water circulating path from which water is leaking. Correspondingly, the temperature detected by the first water temperature 15 increases.

Then, the controller 16 determines whether or not the temperature detected by the first water temperature 15 is not lower than the third threshold (step S39). If it is determined that the temperature detected by the first temperature detector 15 is lower than the third threshold (NO in step S39), the controller 16 returns to step S38. Thereby, the freezing suppressing operation is carried out without circulating the water in the water circulating path from which the water is leaking, until the temperature detected by the first temperature detector 15 reaches a temperature which is not lower than the third threshold. As a result, the water remaining in the water circulating path from which water is leaking is suppressed from freezing. In addition, the water remaining in the water circulating path from which water is not leaking is suppressed from freezing, as in the case of normal freezing suppressing operation.

If it is determined that the temperature detected by the first water temperature 15 is not lower than the third threshold (YES in step S39), the controller 16 stops the water circulator corresponding to the water circulating path in which the water leakage abnormality is not detected, and stops all of the heaters 33, 34, and 45 (step S42). In this manner, the freezing suppressing operation is stopped. In accordance with the above described fuel cell system 501 of the present embodiment, if the temperature detected by the first temperature detector 15 is not higher than the first threshold, in the normal shut-down state or in the abnormal shut-down state which results from occurrence of the second abnormality, the freezing suppressing operation is carried out in such a manner that the cooling water circulator 8, the hot water circulator 10, and the recovered water circulator 13 are operated, and the cooling water heater 33, the hot water heater 34, and the recovered water heater 35 are operated. However, the freezing suppressing operation is in no way limited to the above. For example, the freezing suppressing operation may be such that the cooling water circulator 8, the hot water circulator 10, and the recovered water circulator 13 are firstly operated, if the temperature detected by the first temperature detector 15 is not higher than a predetermined threshold higher than the first threshold, and the cooling water heater 33, the hot water heater 34, and the recovered water heater 35 are thereafter operated at a time point when the temperature detected by the first temperature detector 15 becomes a temperature which is not higher than the first threshold.

In accordance with the fuel cell system 501 of Embodiment 7 as described above, for the water circulating path in which the abnormality relating to the leakage of water is detected, it is possible to suppress water leakage damage from spreading, and to suppress a chance of a failure of the water circulator which would be caused by operating the water circulator without water. In addition, it is possible to suppress freezing of the water remaining in the water path from water is leaking, and suppress freezing in the water circulating path in which the abnormality relating to leakage of water is not detected, like normal shut-down state (stand-by state).

Embodiment 8

In Embodiment 8 of the present invention, in the freezing suppressing operation of the water circulating path in which the abnormality relating to leakage of water is detected, the amount of heating performed by the corresponding heater is set larger, in Embodiment 7.

A fuel cell system of Embodiment 8 is identical to the fuel cell system 501 of Embodiment 7 in a configuration of hardware, and is different from the fuel cell system 501 of Embodiment 7 in a configuration of a control system.

Figure 11:
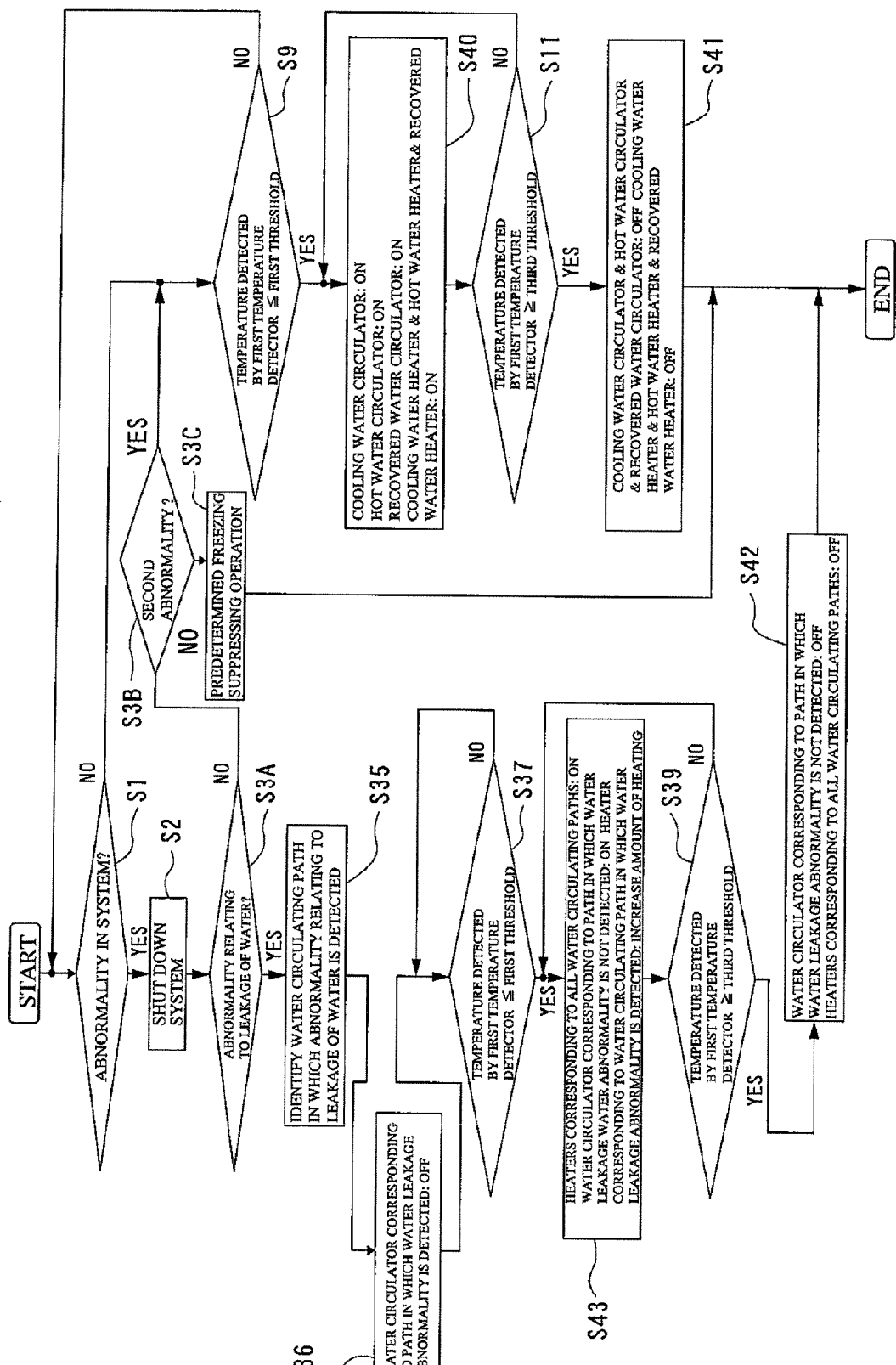
FIG. 11 is a flowchart showing a content of freezing suppressing control at abnormal shut down in a fuel cell system according to Embodiment 8 of the present invention.

FIG. 11 is a flowchart showing a content of freezing suppressing control at abnormal shut down in the fuel cell system according to Embodiment 8 of the present invention.

Freezing suppressing control at abnormal shut down of the system of Embodiment 8 is an example of control in which "in the heating operation performed by the first and second heaters to suppress freezing, in a case where leakage of water from the first water circulating path is detected by the first abnormality detector, but leakage of water from the second water circulating path is not detected, and the fuel cell system is shut down, the amount of heating performed by the first heater is set larger than that in the case where the first abnormality is not detected, and the amount of heating performed by the second heater is set equal to that in the case where the first abnormality is not detected.

As shown in FIG. 11, in the freezing suppressing control in the abnormal shut down of the system of Embodiment 8 of the present invention, step 43 is performed instead of step 38 in Embodiment 7 (FIG. 10). In other respect, the freezing suppressing control at the abnormal shut down of the system of Embodiment 8 is identical to that of Embodiment 7.

In step S43, the controller 16 operates the water circulator corresponding to the water circulating path in which no water leakage abnormality is detected, and operates all of the heaters in such a manner that the amount of heating performed by the heater corresponding to the water circulating path in which the water leakage abnormality is detected is set larger than the amount of heating performed by the heater corresponding to the water circulating path in which no water leakage abnormality is detected (step 40). As a result, it is possible to prevent a reduction of an anti-freezing ability which would be caused by the fact that the water circulating operation is not executed, in the water circulating path in which the water leakage abnormality is detected.

In accordance with the above described fuel cell system of Embodiment 8, the amount of heating performed by the heater corresponding to only the water circulating path in which the abnormality relating to leakage of water is detected is set larger than the amount of heating performed by the heater in the case where the abnormality relating to leakage of water is not detected, in order to prevent a reduction of an anti-freezing ability which is caused by non-execution of the water circulating operation, while the amount of heating performed by the heater corresponding to the water circulating path in which the abnormality relating to leakage of water is not detected, is set equal to the amount of heating performed by the heater in the case where the abnormality relating to leakage of water is not detected. As a result, it is possible to suppress an increase in electric power consumption due to an increase in the amount of heating caused by unnecessary heating.

Embodiment 9

In Embodiment 9 of the present invention, in the freezing suppressing operation in the case where the abnormality relating to leakage of water is detected, the temperature threshold of the first temperature detector 15 at which the heater is actuated, is set higher than that in the freezing suppressing operation in the case where the abnormality relating to leakage of water is not detected, in Embodiment 7.

A fuel cell system of Embodiment 9 is identical to the fuel cell system 501 of Embodiment 7 in a configuration of hardware, and is different from the fuel cell system 501 of Embodiment 7 in a configuration of a control system.

Figure 12:
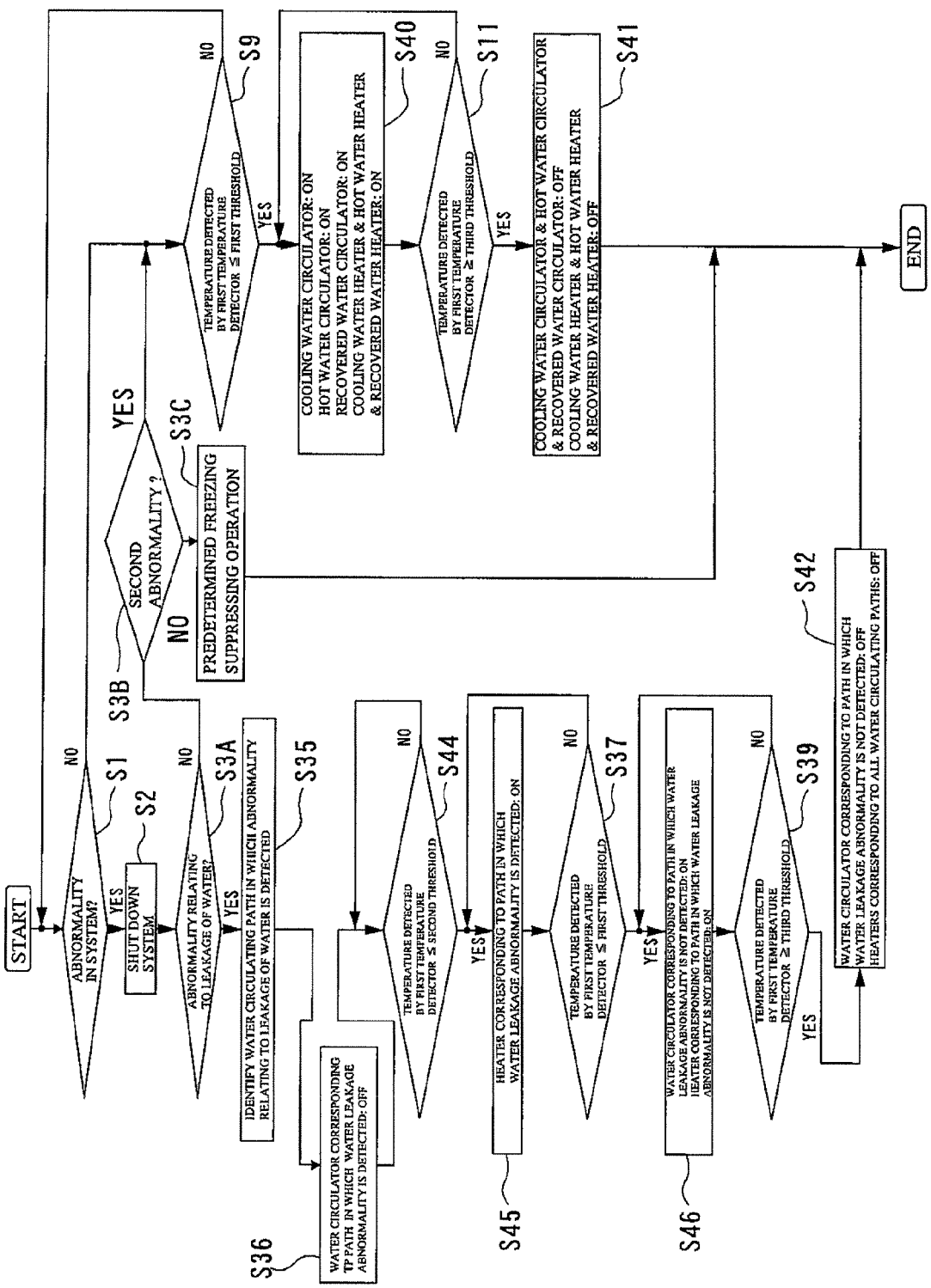
FIG. 12 is a flowchart showing a content of freezing suppressing control at abnormal shut down in a fuel cell system according to Embodiment 9 of the present invention.

FIG. 12 is a flowchart showing a content of freezing suppressing control at abnormal shut down in the fuel cell system according to Embodiment 9 of the present invention.

The freezing suppressing control at the abnormal shut down of the system of Embodiment 9 is an example of control in which "in the case where leakage of water from the first water circulating path is detected by the first abnormality detector as the first abnormality, but leakage of water from the second water circulating path is not detected, and the fuel cell system is shut down, the first heater is operated to suppress freezing if the temperature detector detects a temperature which is not higher than a second threshold higher than the first threshold, and the second heater is operated to suppress freezing if the temperature detector detects a temperature which is not higher than the first threshold.

Referring to FIG. 12, in the freezing suppressing control at abnormal shut down of the system of Embodiment 9 of the present invention, step S44 and step S45 are performed between step S36 and step S37 in the freezing suppressing control at the abnormal shut down of the system of Embodiment 7, and step S46 is performed instead of step S43. In other respect, the freezing suppressing control at the abnormal shut down of the system of Embodiment 9 is identical to that of Embodiment 7.

In step S44, the controller 16 determines whether or not the temperature detected by the first temperature 15 is not higher than the second threshold. In Embodiment 9, the first threshold is defined as a temperature which is as low as possible and at which the cooling water, the hot water, and the recovered water which are being circulated are kept from freezing. The second threshold is defined as a value higher than the first threshold. The first threshold and the second threshold depend on a design of the fuel cell system, and therefore are suitably determined by, for example, an experiment, a simulation, etc.

If it is determined that the temperature detected by the first temperature detector 15 is higher than the second threshold (NO in step S44), the controller 16 stands by until the temperature detected by the first temperature detector 15 reaches a temperature which is not higher than the second threshold.

On the other hand, if it is determined that the temperature detected by the first temperature detector 15 is not higher than the second threshold, the controller 16 operates a heater corresponding to a water circulating path in which the abnormality relating to leakage of water is detected as the freezing suppressing operation (step S45).

In step S46, if it is determined that the temperature detected by the first temperature detector 15 is not higher than the first threshold in step S37, the water circulator and the heater corresponding to the water circulating path in which the abnormality relating to leakage of water is not detected are operated.

In accordance with the fuel cell system of Embodiment 9 configured as described above, for only the water circulating path in which the abnormality relating to leakage of water is detected, the temperature threshold of the first temperature detector 15 at which the corresponding heater is actuated is set higher than that in the case where the abnormality relating to leakage of water is not detected, in order to advance the start of the actuation of the heater to address a decrease in the temperature of water, while for the water circulating path in which the abnormality relating to leakage of water is not detected, the temperature threshold of the first temperature detector 15 at which the corresponding heater is actuated is set equal to that in the case where the abnormality relating to leakage of water is not detected. As a result, it is possible to suppress an increase in electric power consumption which would be caused by unnecessarily advancing start of the actuation of the heater.

Modified Example 1 of Embodiment 1 to Embodiment 9

In Modified example 1, a flow meter (not shown) as the "first abnormality detector" for indirectly detecting "leakage of water" is provided on the hot water path 9A, instead of the second temperature detector 29 and the third temperature detector 30 as the "first abnormality detectors" for indirectly detecting "leakage of water." The flow meter detects the flow rate of hot water flowing through the hot water path 9A and inputs the detected flow rate to the controller 16. If water leaks from the hot water path 9A, the detected flow rate of hot water flowing through the hot water path 9A decreases. Accordingly, a predetermined flow rate threshold is set in the controller 16 and the controller 16 determines that water is leaking from the hot water circulating path 9 when the flow rate of the hot water detected by the flow meter is not higher than the predetermined flow rate threshold. In other respects, Modification example 1 is similar to the above.

In accordance with this configuration, advantages similar to the above can be achieved.

Modified Example 2 of Embodiment 1 to Embodiment 9

In Modification example 2, "first abnormality detector" for directly detecting "leakage of water" is exemplarily described. Although modified example of Embodiment 1 will be discussed hereinafter, this may be applied to Embodiment 2 to Embodiment 9 in the same manner.

Figure 13:
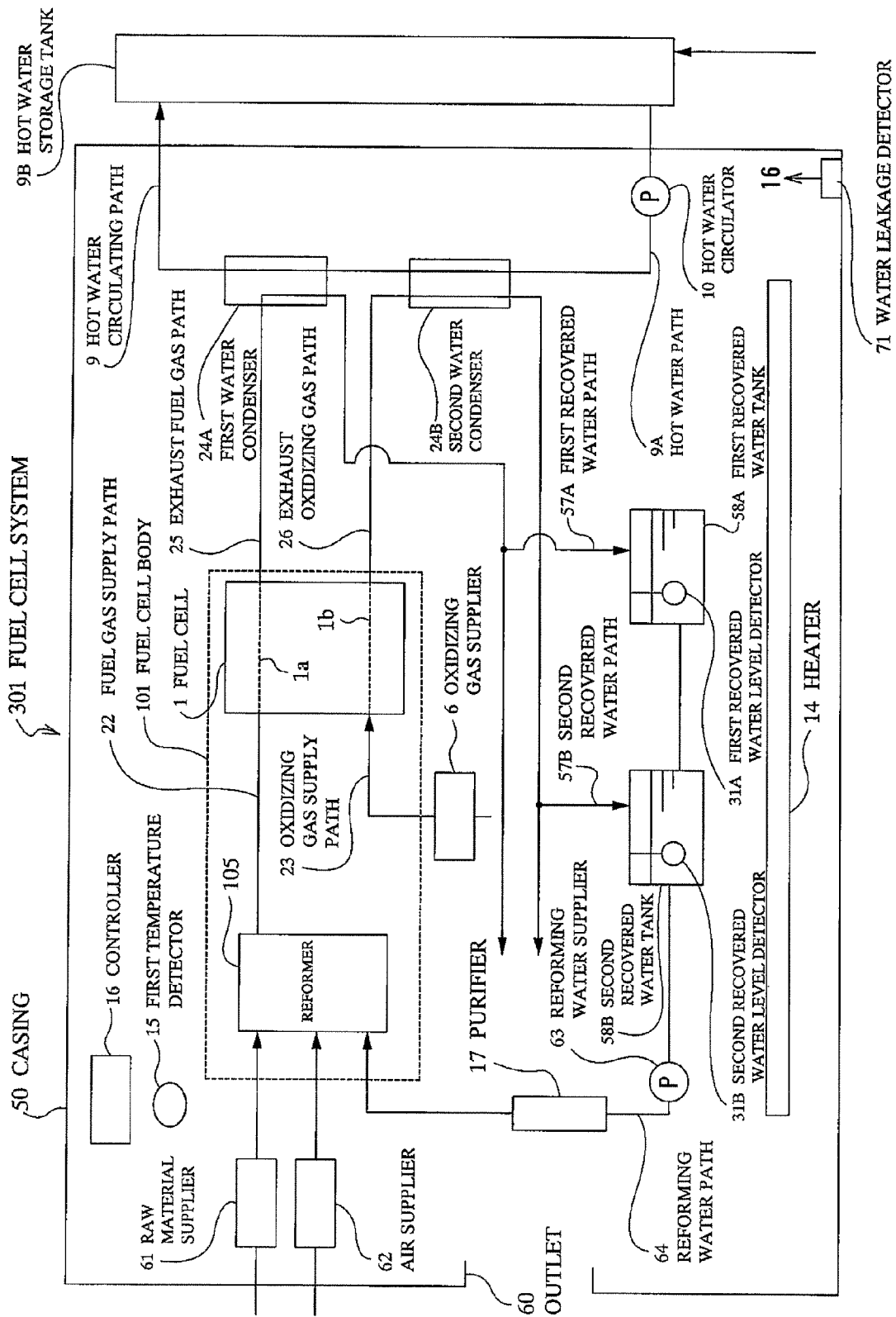
FIG. 13 is a block diagram showing an exemplary configuration of a fuel cell system according to Modified example 2 of Embodiments of the present invention.

FIG. 13 is a block diagram showing a configuration of a fuel cell system according to Modified example 2. In Modified example 2, a water leakage detector 71 as the "first abnormality detector" for directly detecting "leakage of water" is provided instead of the second temperature detector 29 and the third temperature detector 30 as "first abnormality detector" for indirectly detecting "leakage of water," in Embodiment 1 (FIG. 1). The water leakage detector 71 is constituted by, for example, a water leakage sensor. The water leakage sensor is well-known. For example, a water leakage sensor including a pair of electrodes and adapted to sense water present between the pair of electrodes, as leakage of water, may be used. The water leakage detector 71 is attached at a suitable location of the bottom of the casing 50 (e.g., below the hot water path 9A) to detect the water leaking from the hot water path 9A. A water leakage detection signal (water leakage sensing signal) of the water leakage detector 71 is input to the controller 16. Upon reception of the water leakage detection signal (water leakage sensing signal) from the water leakage detector 71, the controller 16 determines that the abnormality relating to leakage of water has occurred, and stops the hot water circulator 10. In other respects, Modification example 2 is similar to Embodiment 1.

In accordance with Modified example 2, advantages similar to those of Embodiment 1 to Embodiment 9 can be achieved.

Figure 14:
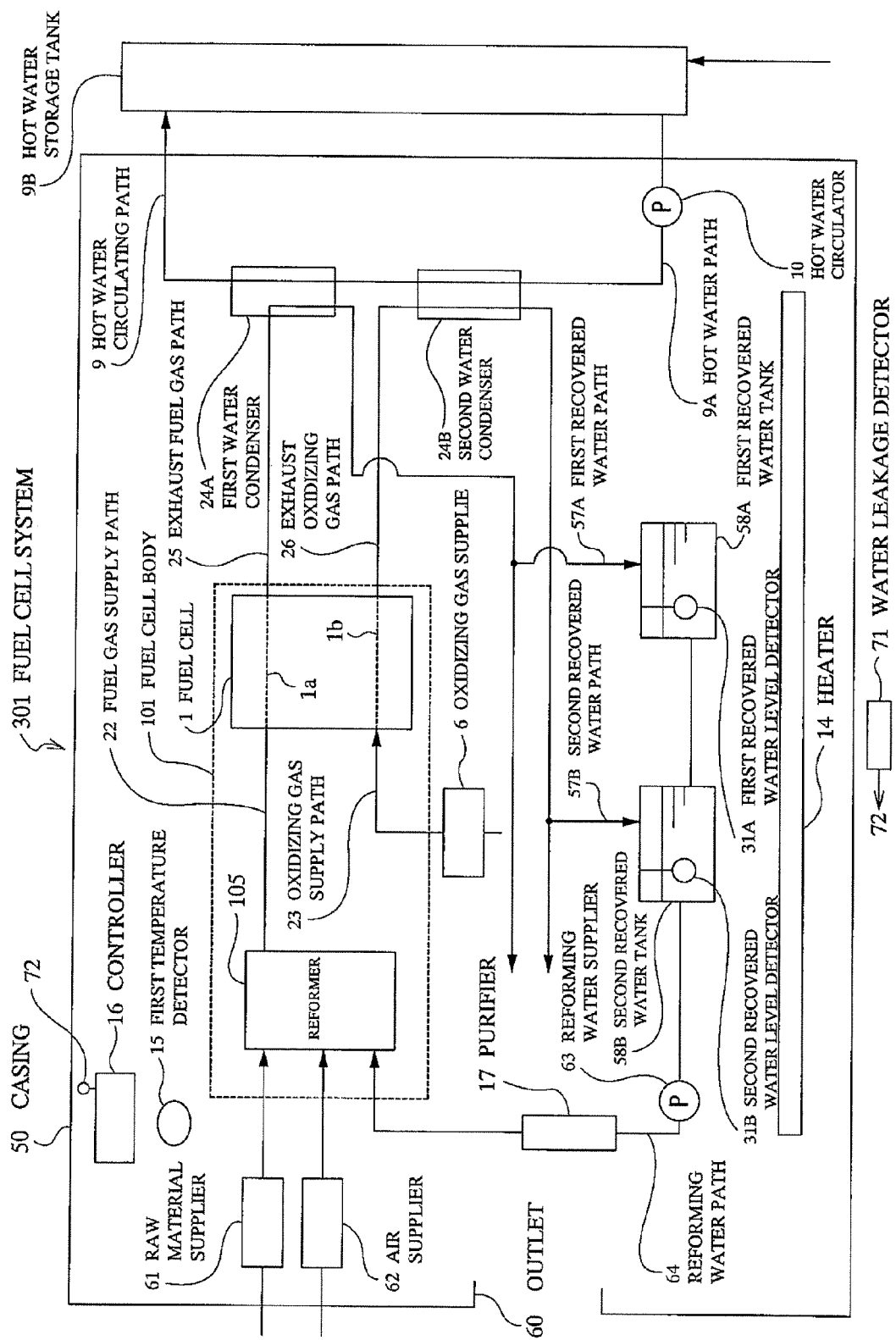
FIG. 14 is a block diagram showing another exemplary configuration of a fuel cell system according to Modified example 2 of Embodiments of the present invention.
Figure 15:
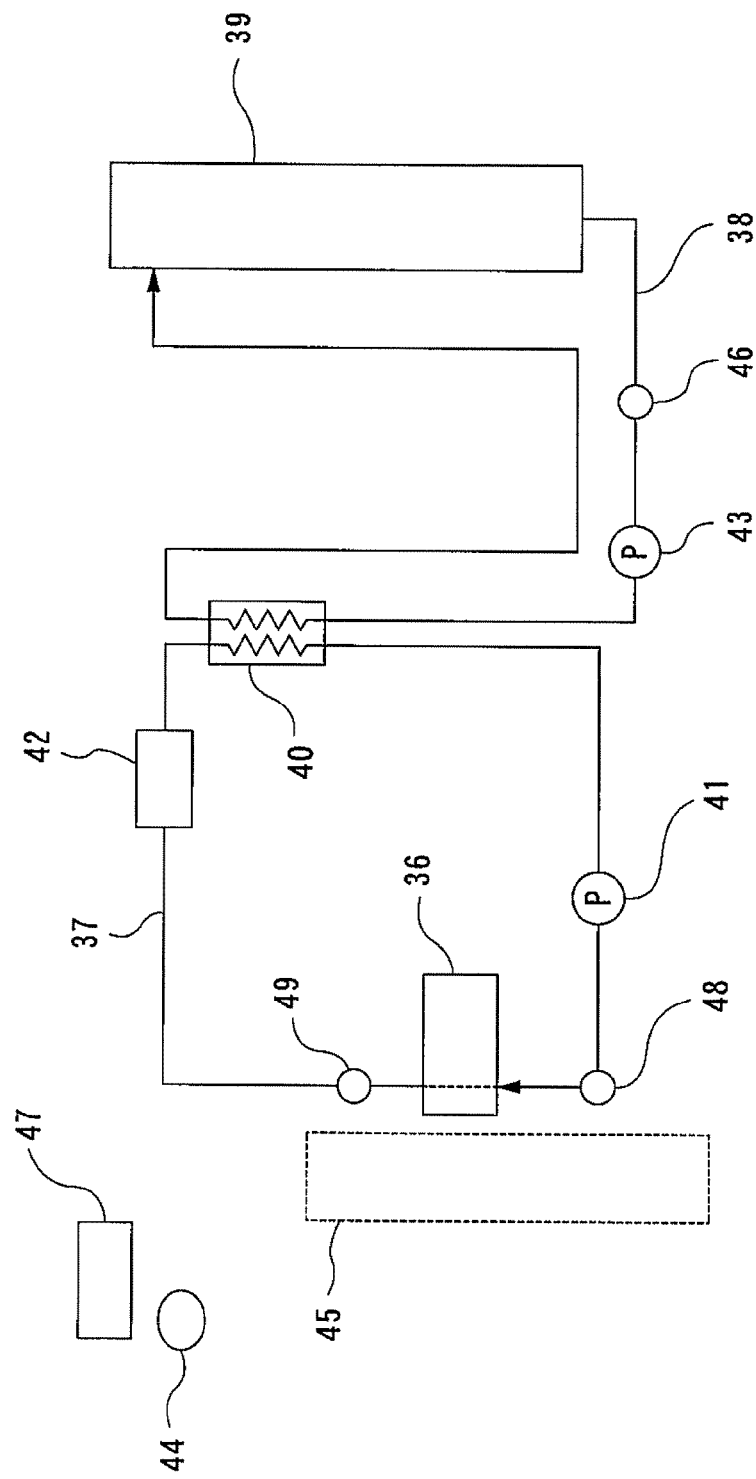
FIG. 15 is a block diagram showing a configuration of the conventional fuel cell system.

Although the water leakage detector 71 is provided inside the casing 50 of the fuel cell system, it may be provided outside the casing 50 of the fuel cell system and positioned to be able to detect water which leaks from the water circulating path (e.g., at least one of the hot water circulating path 9, cooling water circulating path 7, and the recovered water circulating path 12) within the fuel cell system, as shown in FIG. 14. In this case, a detection signal from the water leakage detector 71 is input to the controller 16 by a wire or by radio. For example, when the detection signal is input to the controller 16 by a wire, the controller 16 is provided with a water leakage detection signal input terminal 72 to which the detection signal from the water leakage detector 71 is input.

In the above Embodiments 1 to 9, and Modified examples 1 and 2 of Embodiments 1 to 9, it is determined whether or the detected abnormality is the second abnormality. Alternatively, determination as to the second abnormality may be omitted and control identical to that in the case where no abnormality occurs (stand-by state) may be performed on the ground that an abnormal shut-down process of the system is performed properly to correspond to an abnormality (e.g., leakage of combustible gas) after detecting the abnormality. In other words, the controller 16 may be configured such that "it does not inhibit the heating operation for suppressing freezing," in the case where an abnormality which has occurred is an abnormality different from the abnormality relating to leakage of water.

The above Embodiments 1 to 9, and Modified examples 1 and 2 may be suitably combined so long they are consistent with each other (they do not exclude each other).

A fuel cell system of the present invention comprises a fuel cell configured to generate electric power using fuel gas and oxidizing gas; a water circulating path through which water associated with an operation of the fuel cell system circulates; a water circulator for circulating the water in the water circulating path; a heater for heating the water circulating path; a first abnormality detector for detecting a first abnormality which is an abnormality relating to leakage of water from the water circulating path; and a controller; the fuel cell system being configured to cause the water circulator to perform a water circulating operation for circulating the water in the water circulating path and cause the heater to perform a heating operation for heating the water circulating path, to suppress freezing in the water circulating path; wherein the controller is configured to inhibit the water circulating operation for suppressing freezing and not to inhibit the heating operation for suppressing freezing, in a case where the fuel cell system is shut down in response to detection of the first abnormality by the first abnormality detector.

The fuel cell system may further comprise a second abnormality detector for detecting a second abnormality different from the first abnormality; herein the controller may be configured to inhibit the water circulating operation for suppressing freezing and not to inhibit the heating operation for suppressing freezing, in a case where the fuel cell system is shut down in response to detection of the first abnormality by the first abnormality detector; and wherein the controller may be configured not to inhibit the water circulating operation for suppressing freezing and not to inhibit the heating operation for suppressing freezing, in a case where the fuel cell system is shut down in response to detection of the second abnormality by the second abnormality detector.

The water circulating path may be at least one of: a cooling water circulating path comprising a cooling water path through which cooling water for cooling the fuel cell flows; and a cooling water tank for storing the cooling water; a hot water circulating path comprising a hot water path through which hot water for recovering heat from the cooling water flowing through the cooling water path and a hot water storage tank for storing the hot water; and a recovered water circulating path comprising a recovered water tank for storing water recovered from an exhaust gas from the fuel cell and a recovered water path through which the water circulates between the recovered water tank and the cooling water tank.

The water circulating path may comprise a first water circulating path and a second water circulating path; the water circulator comprises a first water circulator for circulating water in the first water circulating path and a second water circulator for circulating water in the second water circulating path; the heater comprises a first heater for heating the first water circulating path and a second heater for heating the second water circulating path; the controller may be configured to inhibit the first water circulator from performing a water circulating operation for suppressing freezing in the first water circulating path, not to inhibit the first heater from performing a heating operation for suppressing freezing in the first water circulating path, not to inhibit the second water circulator from performing a water circulating operation for suppressing freezing in the second water circulating path, and not to inhibit the second heater from performing a heating operation for suppressing freezing in the second water circulating path, in a case where leakage of water from the first water circulating path is detected by the first abnormality detector as the first abnormality but leakage of water from the second water circulating path is not detected, and the fuel cell system is shut down.

The water circulating path and the second water circulating path may be a combination of two from among a cooling water circulating path comprising a cooling water path through which cooling water for cooling the fuel cell flows; and a cooling water tank for storing the cooling water; a hot water circulating path comprising a hot water path through which hot water for recovering heat from the cooling water flowing through the cooling water path and a hot water storage tank for storing the hot water; and a recovered water circulating path comprising a recovered water tank for storing water recovered from an exhaust gas from the fuel cell and a recovered water path through which the water circulates between the recovered water tank and the cooling water tank.

The controller may be configured to set an amount of heating in the heating operation performed by the heater to suppress freezing, in the case where the fuel cell system is shut down in response to detection of the first abnormality by the first abnormality detector, larger than an amount of heating performed by the heater in the case where the first abnormality is not detected.

The controller may be configured to, in the heating operation performed by the first heater and the heating operation performed by the second heater to suppress freezing in the case where leakage of water from the first water circulating path is detected by the first abnormality detector but leakage of water from the second water circulating path is not detected, and the fuel cell system is shut down, set an amount of heating performed by the first heater larger than in the case where the first abnormality is not detect; and set an amount of heating performed by the second heater equal to an amount of heating performed by the second heater in the case where the first abnormality is not detected.

The fuel cell system may further comprise a temperature detector for detecting a temperature of the water; wherein the controller may be configured to execute the heating operation to suppress freezing if the temperature detector detects a temperature which is not higher than a first threshold in the case where the first abnormality detector does not detect the first abnormality; and the controller may be configured to execute the heating operation to suppress freezing if the temperature detector detects a temperature which is not higher than a second threshold higher than the first threshold in the case where first abnormality detector detects the first abnormality.

The fuel cell system may further comprise a temperature detector for detecting a temperature of the water; wherein the controller may be configured to operate the first heater and the second heater as the heating operation to suppress freezing if the temperature detector detects a temperature which is not higher than a first threshold; the controller may be configured to operate the first heater to suppress freezing if the temperature detector detects a temperature which is not higher than a second threshold higher than the first threshold in the case where leakage of water from the first water circulating path is detected by the first abnormality detector as the first abnormality but leakage of water from the second water circulating path is not detected, and the fuel cell system is shut down; the controller may be configured to operate the second heater to suppress freezing if the temperature detector detects a temperature which is not higher than the first threshold, in the case where leakage of water from the first water circulating path is detected by the first abnormality detector as the first abnormality but leakage of water from the second water circulating path is not detected, and the fuel cell system is shut down.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A fuel cell power generation system of the present invention includes a fuel cell, a water circulating path, and a freezing suppressing means at abnormal shut down of the system, and is useful as a fuel cell system for use in home, etc.

REFERENCE SIGNS LISTS 1, 36 fuel cell
1a internal fuel gas passage
1b internal oxidizing gas passage
1c internal cooling water passage
2 fuel cell unit
4 hot water storage unit
5 hydrogen generator
6 oxidizing gas supplier
7 cooling water circulating path
7A, 37 cooling water path
7B cooling water tank
8, 41 cooling water circulator
9 hot water circulating path
9A, 38 hot water path
9B, 39 hot water storage tank
10, 43 hot water circulator
11, 40 heat exchanger
12 recovered water circulating path
12A recovered water tank
12B recovered water path
13 recovered water circulator
14, 42 heater
15 first temperature detector
16, 47 controller
17 purifier
18 combustor
19 material gas supply path
21 reforming water supply path
22 fuel gas supply path
23 oxidizing gas supply path
24 water condenser
24A first water condenser
24B second water condenser
25 exhaust fuel gas path
26 exhaust oxidizing gas path
27 condensed water path
28 cooling water level detector
29 second temperature detector
30 third temperature detector
31 recovered water level detector
31A first recovered water level detector
31B second recovered water level detector
32 extinction detector
33 cooling water heater
34 hot water heater
35 recovered water heater
44 outside air temperature detecting means
45 cooling water temperature detecting means
46 hot water temperature detecting means
48 first cooling water temperature detecting means
49 second cooling water temperature detecting means
50 casing
57A first recovered water path
57B second recovered water tank
58A first recovered water tank
58B second recovered water tank
60 outlet
61 raw material supplier
62 air supplier
63 reforming water supplier
71 water leakage detector
72 water leakage detection signal input terminal
101 fuel cell body
105 reformer
301, 401, 501 fuel cell system

The invention claimed is:

1. A method of operating a fuel cell system, comprising steps of:
(a) circulating water in a water circulating path in the fuel cell system by a water circulator to suppress freezing in the water circulating path;
(b) heating a recovered water tank for storing water which has been recovered from an exhaust gas discharged from a fuel cell and has not been purified in a purifier, to suppress freezing in the recovered water tank;
(c) detecting a first abnormality which is an abnormality relating to leakage of water from the water circulating path; and
(d) inhibiting the step (a) and not inhibiting the step (b), in a case where the fuel cell system is shut down in response to detection of the first abnormality, wherein:
the water circulating path includes a recovered water circulating path comprising the recovered water tank and a recovered water path through which the water circulates between the recovered water tank and a cooling water tank,
the step (a) comprises steps of:
(a1) circulating water in a first water circulating path by a first water circulator to suppress freezing in the first water circulating path; and
(a2) circulating water in a second water circulating path by a second water circulator to suppress freezing in the second water circulating path,
the step (c) comprises steps of:
(c1) detecting, as the first abnormality, an abnormality relating to leakage of water from the first water circulating path; and
(c2) detecting, as the first abnormality, an abnormality relating to leakage of water from the second water circulating path, and
the step (d) comprises steps of:
(d1) inhibiting the step (a1) and not inhibiting the step (b), in a case where leakage of water from the first water circulating path is detected but leakage of water from the second water circulating path is not detected, and the fuel cell system is shut down; and
(d2) not inhibiting the step (a2) and not inhibiting the step (b), in a case where leakage of water from the first water circulating path is detected but leakage of water from the second water circulating path is not detected, and the fuel cell system is shut down, one of the first water circulating path and the second water circulating path includes the recovered water circulating path, the second water circulating path includes the recovered water circulating path, and the first water circulating path includes one of:
- a cooling water circulating path comprising a cooling water path through which cooling water for cooling the fuel cell flows, and the cooling water tank for storing the cooling water; and
- a hot water circulating path comprising a hot water path through which hot water for recovering heat from the cooling water flowing through the cooling water path, and a hot water storage tank for storing the hot water.

2. The method according to claim 1, wherein:
an amount of heating the recovered water tank in the step (b) performed in the case where leakage of water from the first water circulating path is detected but leakage of water from the second water circulating path is not detected, and the fuel cell system is shut down, is set greater than an amount of heating the recovered water tank in the step (b) performed in a case where the first abnormality is not detected and the fuel cell system is shut down.

3. The method according to claim 1, further comprising:
detecting a temperature of the water in the water circulating path, wherein
the step (b) is performed if a temperature which is not higher than a first threshold is detected in detecting the temperature of water, in a case where leakage of water from the first water circulating path is detected but leakage of water from the second water circulating path is not detected, and the fuel cell system is shut down.

4. The method according to claim 1, wherein an electric heater is used in the step (b).

5. A method of operating a fuel cell system, comprising steps of:
(a) circulating water in a water circulating path in the fuel cell system by a water circulator to suppress freezing in the water circulating path;
(b) heating a recovered water tank for storing water which has been recovered from an exhaust gas discharged from a fuel cell and has not been purified in a purifier, to suppress freezing in the recovered water tank;
(c) detecting a first abnormality which is an abnormality relating to leakage of water from the water circulating path;
(d) inhibiting the step (a) and not inhibiting the step (b), in a case where the fuel cell system is shut down in response to detection of the first abnormality,
detecting a second abnormality different from the first abnormality; and
not inhibiting the steps (a) and (b), in a case where the fuel cell system is shut down in response to detection of the second abnormality, wherein:
the water circulating path includes a recovered water circulating path comprising the recovered water tank and a recovered water path through which the water circulates between the recovered water tank and a cooling water tank,
the step (a) comprises steps of:
(a1) circulating water in a first water circulating path by a first water circulator to suppress freezing in the first water circulating path; and
(a2) circulating water in a second water circulating path by a second water circulator to suppress freezing in the second water circulating path, the step (c) comprises steps of:
(c1) detecting, as the first abnormality, an abnormality relating to leakage of water from the first water circulating path; and
(c2) detecting, as the first abnormality, an abnormality relating to leakage of water from the second water circulating path, and
the step (d) comprises steps of:
(d1) inhibiting the step (a1) and not inhibiting the step (b), in a case where leakage of water from the first water circulating path is detected but leakage of water from the second water circulating path is not detected, and the fuel cell system is shut down; and
(d2) not inhibiting the step (a2) and not inhibiting the step (b), in a case where leakage of water from the first water circulating path is detected but leakage of water from the second water circulating path is not detected, and the fuel cell system is shut down, one of the first water circulating path and the second water circulating path includes the recovered water circulating path,
the second water circulating path includes the recovered water circulating path, and
the first water circulating path includes one of:
- a cooling water circulating path comprising a cooling water path through which cooling water for cooling the fuel cell flows, and the cooling water tank for storing the cooling water; and
- a hot water circulating path comprising a hot water path through which hot water for recovering heat from the cooling water flowing through the cooling water path, and a hot water storage tank for storing the hot water.

6. A method of operating a fuel cell system, comprising steps of:
(a) circulating water in a water circulating path in the fuel cell system by a water circulator to suppress freezing in the water circulating path;
(b) heating a recovered water tank for storing water which has been recovered from an exhaust gas discharged from a fuel cell and has not been purified in a purifier, to suppress freezing in the recovered water tank;
(c) detecting a first abnormality which is an abnormality relating to leakage of water from the water circulating path; and
(d) inhibiting the step (a) and not inhibiting the step (b), in a case where the fuel cell system is shut down in response to detection of the first abnormality, wherein:
the water circulating path includes a recovered water circulating path comprising the recovered water tank and a recovered water path through which the water circulates between the recovered water tank and a cooling water tank,
the water circulating path further includes at least one of:
- a cooling water circulating path comprising a cooling water path through which cooling water for cooling the fuel cell flows, and the cooling water tank for storing the cooling water; and
- a hot water circulating path comprising a hot water path through which hot water for recovering heat from the cooling water flowing through the cooling water path, and a hot water storage tank for storing the hot water,
the step (a) comprises steps of:
(a1) circulating water in a first water circulating path by a first water circulator to suppress freezing in the first water circulating path; and
(a2) circulating water in a second water circulating path by a second water circulator to suppress freezing in the second water circulating path, the step (c) comprises steps of:
- (c1) detecting, as the first abnormality, an abnormality relating to leakage of water from the first water circulating path; and
- (c2) detecting, as the first abnormality, an abnormality relating to leakage of water from the second water circulating path, and the step (d) comprises steps of:
- (d1) inhibiting the step (a1) and not inhibiting the step (b), in a case where leakage of water from the first water circulating path is detected but leakage of water from the second water circulating path is not detected, and the fuel cell system is shut down; and
- (d2) not inhibiting the step (a2) and not inhibiting the step OD), in a case where leakage of water from the first water circulating path is detected but leakage of water from the second water circulating path is not detected, and the fuel cell system is shut down, one of the first water circulating path and the second water circulating path includes the recovered water circulating path, the second water circulating path includes the recovered water circulating path, and the first water circulating path includes one of the cooling water circulating path and the hot water circulating path.

7. The method according to claim 5, wherein:

an amount of heating the recovered water tank in the step (b) performed in the case where leakage of water from the first water circulating path is detected but leakage of water from the second water circulating path is not detected, and the fuel cell system is shut down, is set greater than an amount of heating the recovered water tank in the step (b) performed in a case where the first abnormality is not detected and the fuel cell system is shut down.

8. The method according to claim 6, wherein:

an amount of heating the recovered water tank in the step (b) performed in the case where leakage of water from the first water circulating path is detected but leakage of water from the second water circulating path is not detected, and the fuel cell system is shut down, is set greater than an amount of heating the recovered water tank in the step (b) performed in a case where the first abnormality is not detected and the fuel cell system is shut down.

9. The method according to claim 5, further comprising:

detecting a temperature of the water in the water circulating path, wherein the step (b) is performed if a temperature which is not higher than a first threshold is detected in detecting the temperature of water, in a case where leakage of water from the first water circulating path is detected but leakage of water from the second water circulating path is not detected, and the fuel cell system is shut down.

10. The method according to claim 6, further comprising:

detecting a temperature of the water in the water circulating path, wherein the step (b) is performed if a temperature which is not higher than a first threshold is detected in detecting the temperature of water, in a case where leakage of water from the first water circulating path is detected but leakage of water from the second water circulating path is not detected, and the fuel cell system is shut down.

11. The method according to claim 5, wherein an electric heater is used in the step (b).

12. The method according to claim 6, wherein an electric heater is used in the step (b).

* * * * *